(12) United States Patent
Fujinaka et al.

(10) Patent No.: US 12,080,477 B2
(45) Date of Patent: Sep. 3, 2024

(54) MAGNET MANUFACTURING DEVICE

(71) Applicant: DENSO CORPORATION, Kariya (JP)

(72) Inventors: Tomonori Fujinaka, Kariya (JP); Takuji Harada, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/965,847

(22) Filed: Oct. 14, 2022

(65) Prior Publication Data

US 2023/0122599 A1 Apr. 20, 2023

(30) Foreign Application Priority Data

Oct. 18, 2021 (JP) .................................. 2021-170159

(51) Int. Cl.
| | |
|---|---|
| *B33Y 30/00* | (2015.01) |
| *B29C 64/118* | (2017.01) |
| *B29C 64/209* | (2017.01) |
| *B29C 64/295* | (2017.01) |
| *H01F 41/02* | (2006.01) |

(52) U.S. Cl.
CPC ........ *H01F 41/0266* (2013.01); *B29C 64/118* (2017.08); *B29C 64/209* (2017.08); *B29C 64/295* (2017.08); *B33Y 30/00* (2014.12)

(58) Field of Classification Search
CPC ... B29C 64/118; B29C 64/209; B29C 64/295; B29C 64/194; B33Y 10/00; H01F 41/0266; H01F 41/025
See application file for complete search history.

(56) References Cited

U.S. PATENT DOCUMENTS

| | | |
|---|---|---|
| 2016/0303788 A1 | 10/2016 | Ihara et al. |
| 2018/0236724 A1 | 8/2018 | Compton et al. |
| 2020/0180213 A1* | 6/2020 | Blair ...................... B29C 64/20 |
| 2020/0207022 A1* | 7/2020 | Benedict ............... B29C 64/336 |
| 2020/0223099 A1 | 7/2020 | Kim et al. |
| 2022/0310295 A1* | 9/2022 | Fujinaka ............. H01F 41/0273 |
| 2022/0388241 A1* | 12/2022 | Yelinek ................. C22C 47/025 |

FOREIGN PATENT DOCUMENTS

| | | | |
|---|---|---|---|
| EP | 3711949 A1 | | 9/2020 |
| JP | 2014127686 A | * | 7/2014 |
| JP | 05884425 B2 | | 3/2016 |
| JP | 2016-189462 A | | 11/2016 |
| JP | 2017-183726 A | | 10/2017 |

* cited by examiner

*Primary Examiner* — Nahida Sultana
*Assistant Examiner* — Mohamed K Ahmed Ali
(74) *Attorney, Agent, or Firm* — Posz Law Group, PLC

(57) ABSTRACT

A magnet manufacturing device includes a heater, a nozzle, a magnetic field application magnet and a stage. The heater heats a mixture of magnetic particles and a resin material. The nozzle has an internal flow passage that conducts the mixture while the resin material is molten. The nozzle has a discharge port which discharges the mixture and thereby forms each of a plurality of filaments. The magnetic field application magnet applies a magnetic field to the internal flow passage. The stage has a stage surface on which the plurality of filaments are placed. The discharge port is relatively movable with respect to the stage surface such that the plurality of filaments are stacked to form an arbitrary shape.

8 Claims, 18 Drawing Sheets

MAGNET MANUFACTURING DEVICE

CROSS REFERENCE TO RELATED APPLICATION

This application is based on and incorporates herein by reference Japanese Patent Application No. 2021-170159 filed on Oct. 18, 2021.

TECHNICAL FIELD

The present disclosure relates to a magnet manufacturing device.

BACKGROUND

There has been proposed a magnet manufacturing device. In the previously proposed magnet manufacturing device, at the time of extrusion molding of a sheet-shaped molded body, a magnetic material is oriented by using an orienting magnet. Thereafter, the molded body, which is formed by the extrusion molding, is magnetized by using a magnetizer.

SUMMARY

This section provides a general summary of the disclosure, and is not a comprehensive disclosure of its full scope or all of its features.

According to the present disclosure, there is provided a magnet manufacturing device including:
 a heater that is configured to heat a mixture of magnetic particles and a resin material to melt the resin material;
 a nozzle that extends in a tubular form in an axial direction and has an internal flow passage, which is configured to conduct the mixture in a state where the resin material is molten, wherein the nozzle has a discharge port which is configured to discharge the mixture conducted through the internal flow passage and thereby form each of a plurality of filaments respectively shaped in a form of a thread;
 a magnetic field applicator that is configured to apply a magnetic field, which is directed in the axial direction, to the internal flow passage, wherein the magnetic field has a magnitude that is sufficient to orient each of the magnetic particles in a direction along an axis of easy magnetization of the magnetic particle and to magnetize each of the magnetic particles; and
 a stage that has a stage surface on which the plurality of filaments discharged from the discharge port are placed, wherein:
 the nozzle and the stage are configured such that the discharge port is relatively movable with respect to the stage surface in any direction in three dimensions of space.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
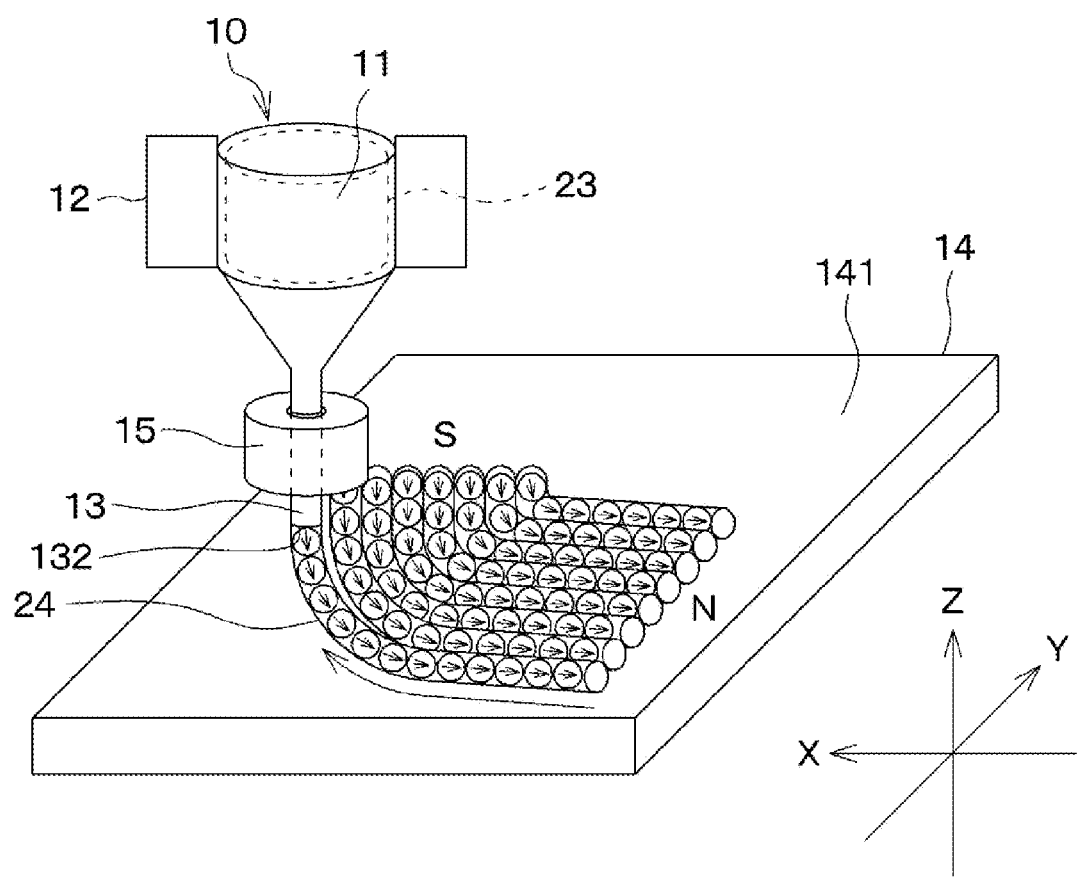
FIG. 1 is a perspective view of a magnet manufacturing device according to a first embodiment.

There has been proposed a magnet manufacturing device. In the previously proposed magnet manufacturing device, at the time of extrusion molding of a sheet-shaped molded body, a magnetic material is oriented by using an orienting magnet. Thereafter, the molded body, which is formed by the extrusion molding, is magnetized by using a magnetizer. A magnitude of a magnetic field (orientation magnetic field), which is generated by the orienting magnet, is 3.5 kOe. A magnitude of a magnetic field (magnetization magnetic field), which is generated by the magnetizer, is equal to or larger than 40 kOe. Furthermore, this magnet manufacturing device laminates the magnetized molded body such that the magnetization direction is alternately oriented in opposite directions, and thereafter this magnet manufacturing device cuts the laminated molded body perpendicularly to the lamination direction. Thereby, there is manufactured a multipole bonded magnet that has the N-poles and the S-poles alternately arranged along an end surface of the multipole bonded magnet.

With the progress of the computer aided engineering (CAE) technology or the like, it is demanded to manufacture magnets whose shape and magnetization direction are arbitrarily designed in order to realize an optimum magnetic circuit used in, for example, electric motors and the like. However, the previously proposed magnet manufacturing device described above has a low degree of freedom in the shape and the magnetization direction of the magnet to be manufactured.

According to one aspect of the present disclosure, there is provided a magnet manufacturing device including:

a heater that is configured to heat a mixture of magnetic particles and a resin material to melt the resin material;

a nozzle that extends in a tubular form in an axial direction and has an internal flow passage, which is configured to conduct the mixture in a state where the resin material is molten, wherein the nozzle has a discharge port which is configured to discharge the mixture conducted through the internal flow passage and thereby form each of a plurality of filaments respectively shaped in a form of a thread;

a magnetic field applicator that is configured to apply a magnetic field, which is directed in the axial direction, to the internal flow passage, wherein the magnetic field has a magnitude that is sufficient to orient each of the magnetic particles in a direction along an axis of easy magnetization of the magnetic particle and to magnetize each of the magnetic particles; and a stage that has a stage surface on which the plurality of filaments discharged from the discharge port are placed, wherein:

the nozzle and the stage are configured such that the discharge port is relatively movable with respect to the stage surface in any direction in three dimensions of space; and the discharge port is relatively movable with respect to the stage surface in any direction in the three dimensions of space such that the plurality of filaments, each of which is discharged from the discharge port and is placed on the stage surface, are stacked to form an arbitrary shape, and an extending direction of each of the plurality of filaments placed on the stage surface corresponds to a target magnetization direction of the filament.

According to this, the discharge port is relatively movable in any direction in the three dimensions of space with respect to the stage surface, and the plurality of filaments are arranged on the stage surface so as to form an arbitrary shape, so that the magnet having the arbitrary shape can be manufactured. Furthermore, the magnetization direction in the inside of the filament is set in the specific direction. Therefore, by orienting each of the filaments placed on the stage surface in the direction that corresponds to the intended magnetization direction, the magnetization direction of the inside of the magnet becomes the intended direction. Thus, it is possible to manufacture the magnet while the shape of the magnet and the magnetization direction of the magnet are arbitrary designed.

Hereinafter, embodiments of the present disclosure will be described with reference to the drawings. In each of the following embodiments, portions, which are the same or equivalent to each other, will be indicated by the same reference signs.

First Embodiment

Figure 2:
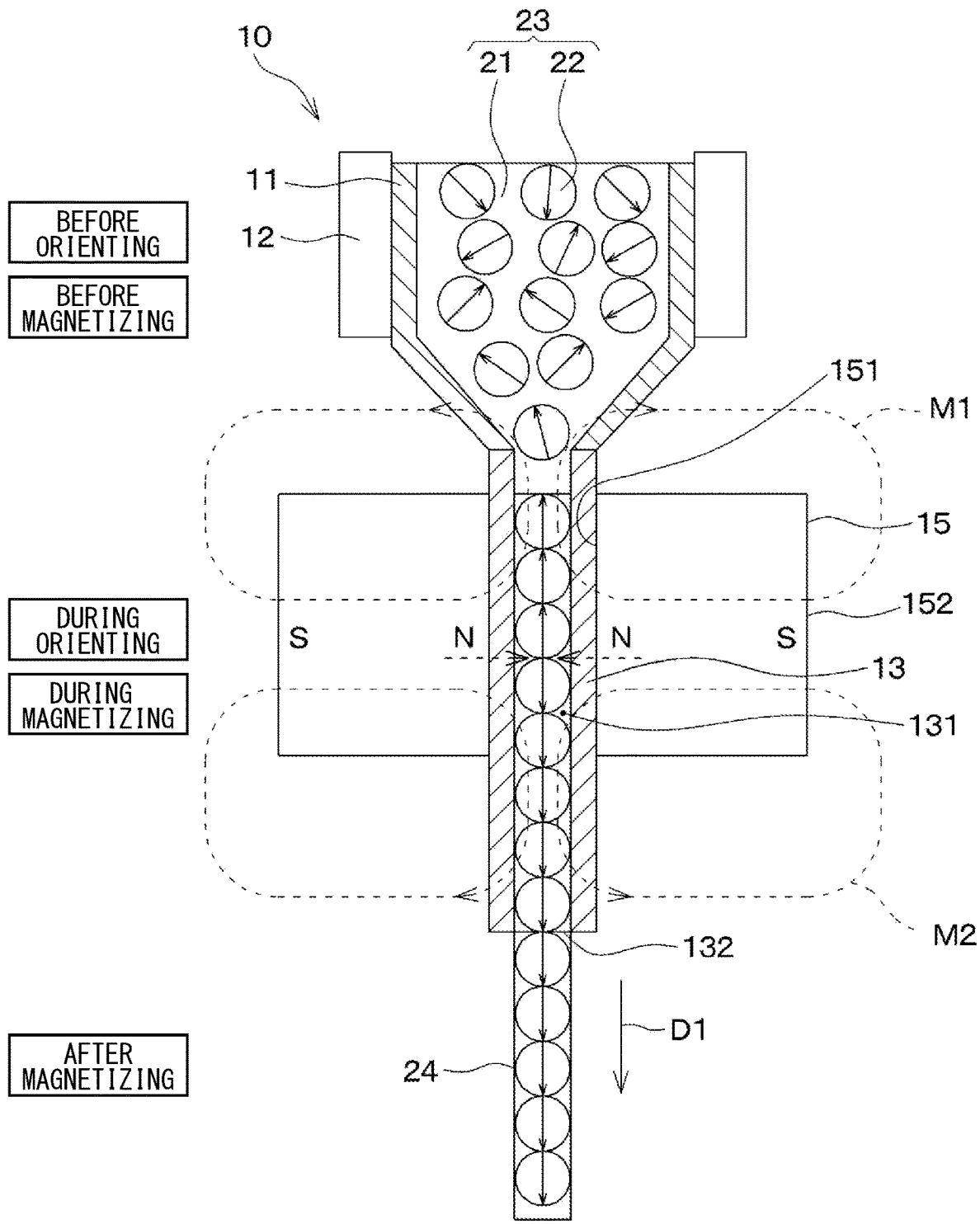
FIG. 2 is a cross-sectional view of a nozzle unit shown in FIG. 1.

As shown in FIGS. 1 and 2, a magnet manufacturing device 10 of a first embodiment includes a material tank 11, a heater 12, a nozzle 13, a stage 14 and a magnetic field application magnet 15.

The material tank 11 receives a mixture 23 that includes a resin material 21 and magnetic particles (a plurality of magnetic particles also referred to as magnetic powder) 22. The resin material 21 and the magnetic particles 22 are mixed at a predetermined ratio. A thermoplastic resin, a thermoplastic elastomer, or the like is used as the resin material 21. The thermoplastic resin may be, for example, polypropylene, polyethylene, polyvinyl chloride, polyester, polyamide, polycarbonate, polyphenylene sulfide, acrylic resin, polycaprolactone or the like. The magnetic particles 22 may be particles (powder) of a magnetic material, such as a ferrite magnetic material, a Sm—Co magnetic material, a Nd—Fe—B magnetic material, a Sm—Fe—N magnetic material or the like. As the magnetic particles 22, it is preferable to use anisotropic magnetic particles rather than isotropic magnetic particles.

The heater 12 is placed at an outside of the material tank 11. The heater 12 is configured to heat the mixture 23 received in the material tank 11 and thereby to melt the resin material 21 in the mixture 23. As a heating method of the heater, a resistance heating method, a high-frequency heating method, or the like may be adopted.

The nozzle 13 is shaped in a tubular form extending linearly in one direction that is an axial direction of the nozzle 13. The one direction is a vertical direction. The nozzle 13 has an inner peripheral surface and an outer peripheral surface. A shape of a transverse cross-section of the nozzle 13 is a circle. That is, a shape of a transverse cross-section of each of the inner peripheral surface and the outer peripheral surface of the nozzle 13 is a circle. The transverse cross-section is a cut plane of the nozzle 13 which is perpendicular to the axial direction. The nozzle 13 has an internal flow passage 131 that conducts the mixture 23 in a state where the resin material 21 is molten. A distal end of the nozzle 13 has a discharge port 132, through which the mixture 23 conducted in the internal flow passage 131 is discharged, to form a filament 24 in a thread form.

The stage 14 has a stage surface 141 on which the filaments 24 discharged from the discharge port 132 of the nozzle 13 are placed. The stage surface 141 is a planar major surface of the stage 14.

The magnetic field application magnet 15 is arranged around the nozzle 13. The magnetic field application magnet 15 is a magnetic field applicator that is configured to apply a magnetic field to the internal flow passage 131 of the nozzle 13 while the magnetic field has a magnitude that is sufficient to orient each of the magnetic particles 22 in a direction along an axis of easy magnetization of the magnetic particle 22 and to magnetize each of the magnetic particles 22. Here, the expression of "to orient" means to align in a common direction or to direct in the common direction. A specific magnitude of the magnetic field will be described later.

Figure 3:
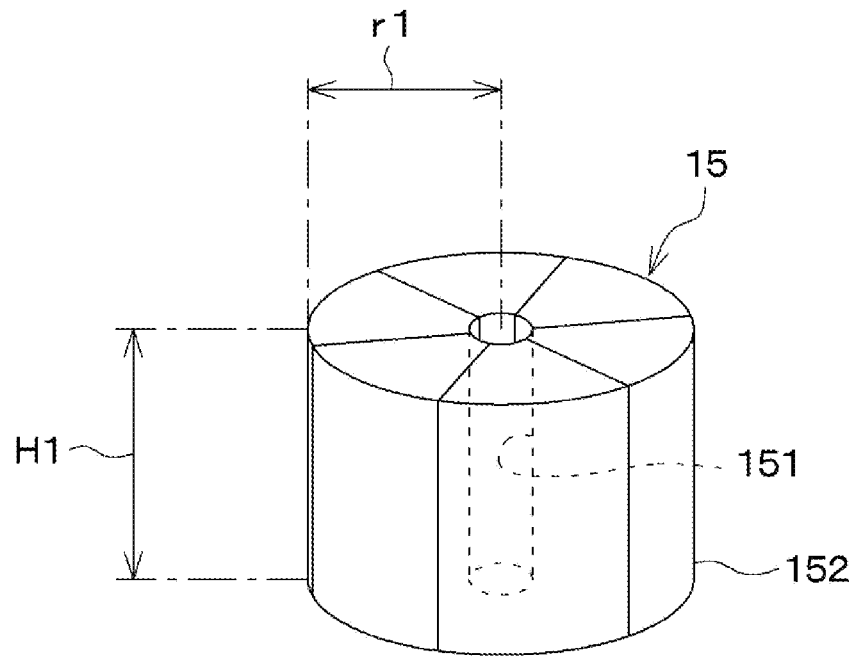
FIG. 3 is a perspective view of a magnetic field application magnet shown in FIG. 1.

As shown in FIG. 3, the magnetic field application magnet 15 is a permanent magnet that has an outer shape in a form of a cylinder. The magnetic field application magnet 15 has: an inner peripheral surface 151, which surrounds a space formed at a center of the magnetic field application magnet 15; and an outer peripheral surface 152. The inner peripheral surface 151 has a shape that is the same as an inner peripheral surface of an ordinary cylindrical tube. Specifically, in a transverse cross-section of the magnetic field application magnet 15, which is perpendicular to the axial direction, the shape of the inner peripheral surface 151 is a circle. The transverse cross-section of the magnetic field application magnet 15 is a cut plane of the magnetic field application magnet 15 which is perpendicular to the axial direction of the nozzle 13. The inner peripheral surface 151 has a common magnetic polarity throughout an entire circumferential extent of the inner peripheral surface 151. The magnetic polarity of the inner peripheral surface 151 is the N-polarity. The outer peripheral surface 152 has a shape that is the same as an outer peripheral surface of the ordinary cylindrical tube. The outer peripheral surface 152 has a common magnetic polarity throughout an entire circumferential extent of the outer peripheral surface 152. The magnetic polarity of the outer peripheral surface 152 is the S-polarity.

In the magnetic field application magnet 15 that has the outer shape in the form of the cylinder, a relationship between a radius r1 of the cylinder and a height H1 of the cylinder is H1>r1. The magnetic field application magnet 15 has a plurality of sections that are formed by dividing the magnetic field application magnet 15, which is shaped in the cylinder, in the circumferential direction.

Figure 4:
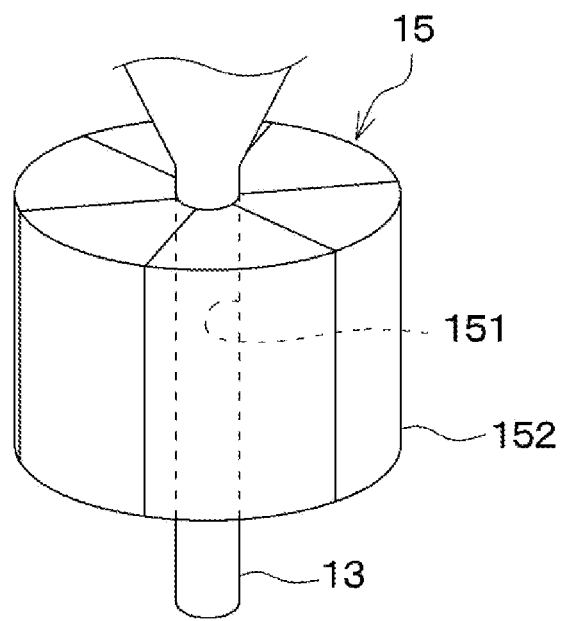
FIG. 4 is a perspective view of the nozzle and the magnetic field application magnet shown in FIG. 1.
Figure 5:
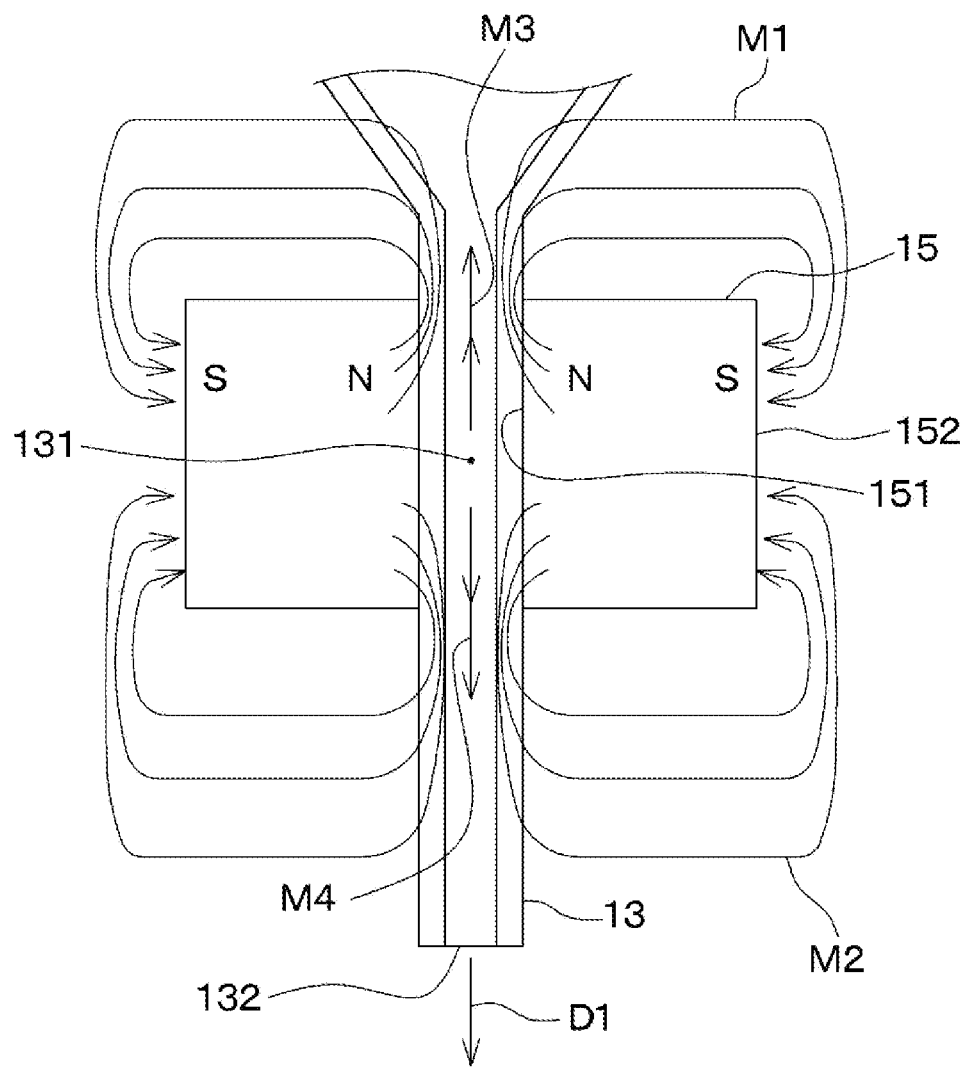
FIG. 5 is a cross-sectional view of the nozzle and the magnetic field application magnet of FIG. 4 taken along a cutting plane which extends along a center line of the nozzle and is parallel with an extending direction of the nozzle.

As shown in FIGS. 4 and 5, the magnetic field application magnet 15 is arranged relative to the nozzle 13 such that the inner peripheral surface 151 surrounds the entire circumferential extent of the outer peripheral surface of the nozzle 13.

The inner peripheral surface 151 contacts the outer peripheral surface of the nozzle 13. Therefore, opposed portions of the inner peripheral surface 151, which are opposed to each other while the nozzle 13 is interposed therebetween, respectively have the common magnetic polarity.

Thus, as shown in FIGS. 2 and 5, there are formed a plurality of magnetic circuits M1, M2, each of which conducts the magnetic flux that is outputted from the inner peripheral surface 151 of the magnetic field application magnet 15 and flows toward the outer peripheral surface 152 of the magnetic field application magnet 15. The magnetic circuits M1, M2 include: an upper magnetic circuit M1, which conducts the magnetic flux that is outputted upwardly from the inner peripheral surface 151 and flows toward the outer peripheral surface 152; and a lower magnetic circuit M2, which conducts the magnetic flux that is outputted downwardly from the inner peripheral surface 151 and flows toward the outer peripheral surface 152.

Thus, as shown in FIG. 5, a plurality of magnetic fields M3, M4, each of which is directed in the axial direction of the nozzle 13, is formed in the internal flow passage 131 of the nozzle 13. More specifically, in an upstream region of the internal flow passage 131, there is formed the magnetic field M3 that has the S-polarity at a front side in a flow direction D1 and the N-polarity at a rear side in the flow direction D1. The flow direction D1 is a flow direction of the mixture 23 that flows in the internal flow passage 131. The upstream region of the internal flow passage 131 is a region that is apart from the discharge port 132 in the internal flow passage 131. In a downstream region of the internal flow passage 131, there is formed the magnetic field M4 that has the N-polarity at the front side in the flow direction D1 and the S-polarity at the rear side in the flow direction D1. The downstream region of the internal flow passage 131 is a region that is adjacent to the discharge port 132 in the internal flow passage 131.

As shown in FIG. 1, the material tank 11, the heater 12, the nozzle 13 and the magnetic field application magnet 15 form a nozzle unit that is integrated together. The nozzle unit is configured to be moved by a moving mechanism (not shown) in any direction in the three dimensions of space. Therefore, the discharge port 132 is relatively movable with respect to the stage surface 141 in any direction (arbitrary direction) in the three dimensions of space. Specifically, the discharge port 132 is movable in any direction (arbitrary direction) in a three-dimensional orthogonal coordinate system having an X-axis, a Y-axis and a Z-axis relative to a reference position located on the stage surface 141. A direction, which is parallel to the stage surface 141, is the axial direction of the X-axis. A direction, which is parallel to the stage surface 141 and is perpendicular to the axial direction of the X-axis, is the axial direction of the Y-axis. A direction, which is perpendicular to the stage surface 141, i.e., is perpendicular to both of the axial direction of the X-axis ad the axial direction of the Y-axis, is the axial direction of the Z-axis.

Furthermore, the magnet manufacturing device 10 includes a feed mechanism, such as a screw (not shown), which is configured to feed the mixture 23. When this feed mechanism is operated, the mixture 23, which is in the state where the resin material 21 is molten, flows toward the discharge port 132 in the internal flow passage 131 of the nozzle 13.

The magnet manufacturing device 10 discharges the mixture 23 from the discharge port 132 of the nozzle 13 relative to the stage surface 141 to place the filament 24 on the stage surface 141. The magnet manufacturing device 10 can manufacture the magnet, which is shaped in an arbitrary shape and is magnetized in an arbitrary direction by relatively moving the discharge port 132 with respect to the stage surface 141 in the arbitrary direction in the three dimensions of space.

Next, a magnet manufacturing method using the magnet manufacturing device 10 will be described. This magnet manufacturing method is a method of manufacturing the magnet by using a fused deposition modeling (FDM) process. The fused deposition modeling process is also referred to as a fused filament fabrication (FFF) process. The word "fused" in "fused deposition modeling process" is synonymous with "melted" and "molten." The magnet manufacturing method includes a melting step of melting the resin material 21, an orienting and magnetizing step of orienting and magnetizing the respective magnetic particles 22, and a placing step of placing the filament 24.

In the melting step of melting the resin material 21, as shown in FIG. 2, the mixture 23 in the material tank 11 is heated by the heater 12. For example, in a case where the polycaprolactone is used as the resin material 21, the heating temperature of the mixture 23 is 150 degrees Celsius. With this heating, the resin material 21 in the mixture 23 is molten. The mixture 23, which is in the state where the resin material 21 is molten, is supplied to the nozzle 13. In FIG. 2, the magnetic particles 22 are shown enlarged one by one. An arrow indicated at an inside of each magnetic particle 22 shown in FIG. 2 indicates a magnetic moment of the magnetic particle 22. A tip of the arrow has the N-polarity. The magnetic particles 22 shown in FIG. 2 are magnetically anisotropic. Therefore, the magnetic moment of each of the magnetic particles 22 is directed (oriented) in one direction. The direction (orientation) of the magnetic moment of each of the magnetic particles 22 at the inside of the material tank 11 is not uniform, i.e., is varied.

In the orienting and magnetizing step of orienting and magnetizing the respective magnetic particles 22, as shown in FIG. 2, the magnetic particles 22 are oriented and are magnetized in the internal flow passage 131 of the nozzle 13. The magnetic field application magnet 15 generates the magnetic field, which is directed in the axial direction of the nozzle 13, in the internal flow passage 131 of the nozzle 13 such that the magnetic field has the magnitude that is sufficient to orient each of the magnetic particles 22 in the direction along the axis of easy magnetization of the magnetic particle 22 and to magnetize each of the magnetic particles 22. Therefore, the orienting and the magnetizing of the respective magnetic particles 22 are simultaneously executed when the mixture 23, which is in the state where the resin material 21 is molten, passes through the internal flow passage 131 of the nozzle 13.

At this time, the magnetic fields M3, M4 shown in FIG. 5 are generated in the internal flow passage 131. Therefore, as shown in FIG. 2, in the upstream region of the internal flow passage 131, the direction (orientation) of the magnetic moment of the respective magnetic particles 22 is set such that the rear side in the flow direction D1 has the N-polarity. In the downstream region of the internal flow passage 131, the direction (orientation) of each magnetic particle 22 is changed, i.e., the direction (orientation) of the magnetic moment of each magnetic particle 22 is reversed. Therefore, the direction (orientation) of the magnetic moment of each magnetic particle 22 is set such that the front side in the flow direction D1 has the N-polarity.

As discussed above, when the mixture 23 flows toward the discharge port 132 in the internal flow passage 131 of the nozzle 13, there exist: the magnetic particles 22, each of which has the magnetic moment that is directed in the one common direction; and the magnetic particles 22, each of which has the magnetic moment that is direction in the opposite common direction, which is opposite to the one common direction. Specifically, the directions of the magnetic moments of the magnetic particles 22 are aligned in the axial direction of the nozzle 13. This is the orienting, which is mainly contributed by the magnetic field M3. In the region of the internal flow passage 131, which is adjacent to the discharge port 132, the magnetic field has the direction of M4 (see the arrow M4 in FIG. 5), and the magnetic particles 22 pass through this region in the state where the magnetic particles 22 are oriented in the common direction. Therefore, the magnetizing of the respective magnetic particles 22 is promoted by reversing only the magnetic moment of the respective magnetic particles 22.

Figure 6:
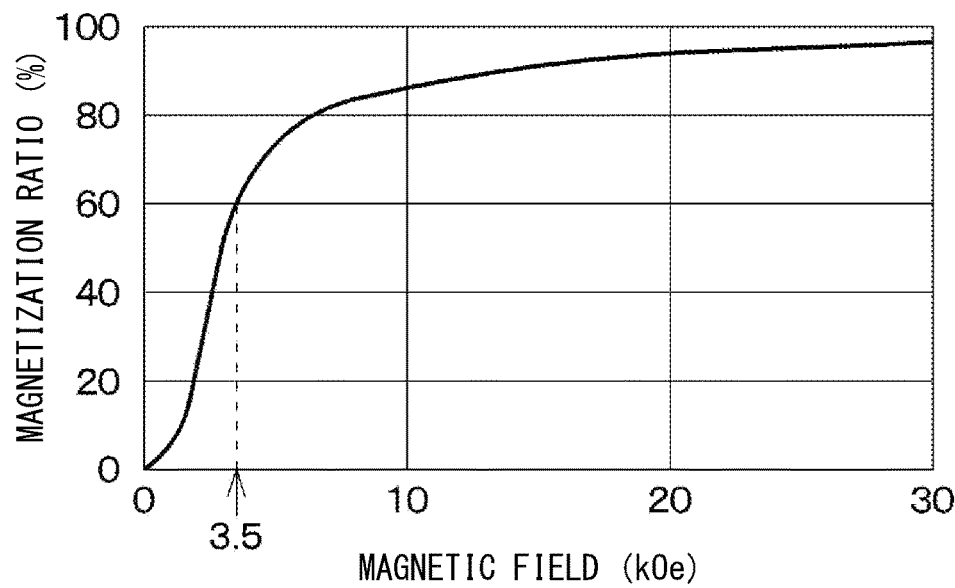
FIG. 6 is a diagram showing a relationship between a magnitude of a magnetic field, which is applied from the magnetic field application magnet to an internal flow passage, and a magnetization ratio of magnetic particles.

The inventors of the present application have studied a relationship between: the magnitude of the magnetic field, which is applied from the magnetic field application magnet 15 to the internal flow passage 131; and the magnetization ratio of the magnetic particles 22. FIG. 6 shows a result of this study. The magnetic particles 22, which are used in this study, are the Sm—Fe—N magnetic particles. The resin material 21, which is used in this study, is the polycaprolactone. A ratio between the magnetic particles 22 and the resin material 21 is as follows: the magnetic particles: the resin material=60 vol %: 40 vol %. When the magnitude of the magnetic field is 3.5 kOe, only about 60% of the magnetic particles 22 inside the filament 24 is magnetized. In contrast, when the magnitude of the magnetic field is equal to or larger than 10 kOe, about 90% or more of the magnetic particles 22 inside the filament 24 is magnetized. According to this result, it is preferable that the magnitude of the magnetic field is equal to or larger than 10 kOe. Here, it should be noted that 3.5 kOe is the magnitude of the magnetic field which is formed by the orienting magnet for orienting the magnetic particles in the common direction in the previously proposed magnet manufacturing device discussed above.

At the placing step of placing the filament 24, as shown in FIG. 2, the mixture 23 is discharged from the discharge port 132, so that the filament 24 is formed. By cooling the resin material 21 in the filament 24, the resin material 21 is solidified in a state in which the directions of the magnetic moments of the magnetic particles 22 are aligned. A direction (referred to as an extending direction), in which the filament 24 extends, becomes a magnetization direction. That is, the direction along the center line of the filament 24 is the magnetization direction.

At this time, as shown in FIG. 1, the filaments 24, each of which is discharged from the discharge port 132, are arranged on the stage surface 141 so as to form the magnet shaped in a target shape. That is, the filaments 24 are drawn (i.e., printed) on the stage surface 141 according to the target shape. Each filament 24 is placed on the stage surface 141 before the resin material 21 is completely solidified. By solidifying the resin material 21, the adjacent filaments 24 are joined together.

An arrow, which is shown next to the filament 24 in FIG. 1, indicates the moving direction of the discharge port 132 relative to the stage surface 141. The discharge port 132 can be moved relative to the reference position of the stage surface 141 in any direction in the three dimensions of space such that the filaments 24 are stacked to form the target shape, and the extending direction of each of the filaments 24 on the stage surface 141 corresponds to a target magnetization direction of the filament 24.

As discussed above, at the placing step of placing the filament 24, the mixture 23, in which the magnetic particles 22 are oriented in the common direction, is discharged from the discharge port 132 to form the plurality of filaments 24, and the plurality of filaments 24 are placed in position. In this way, the magnet is drawn.

Figure 7:
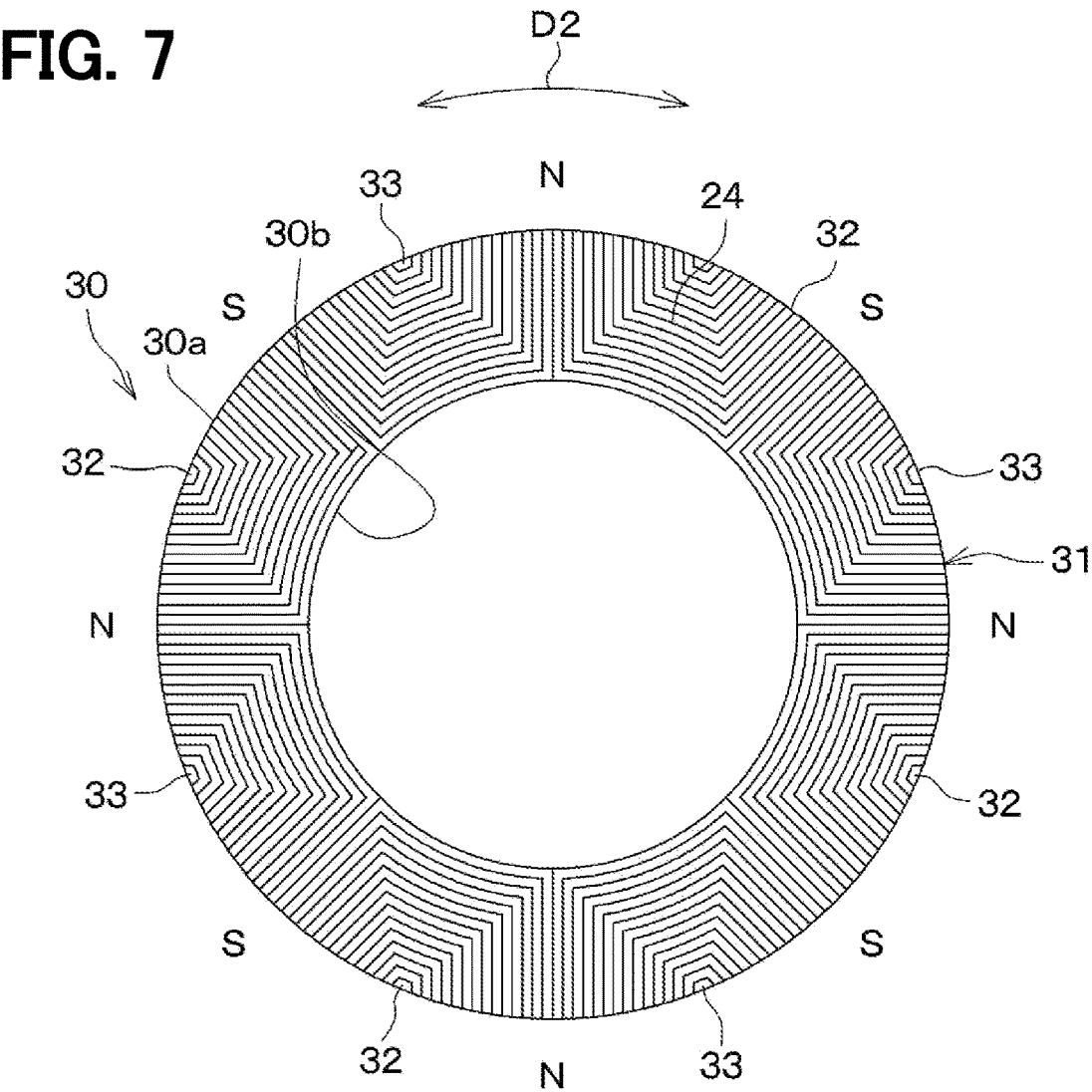
FIG. 7 is a plan view of a bonded magnet which is manufactured by the magnet manufacturing device of the first embodiment.
Figure 8:
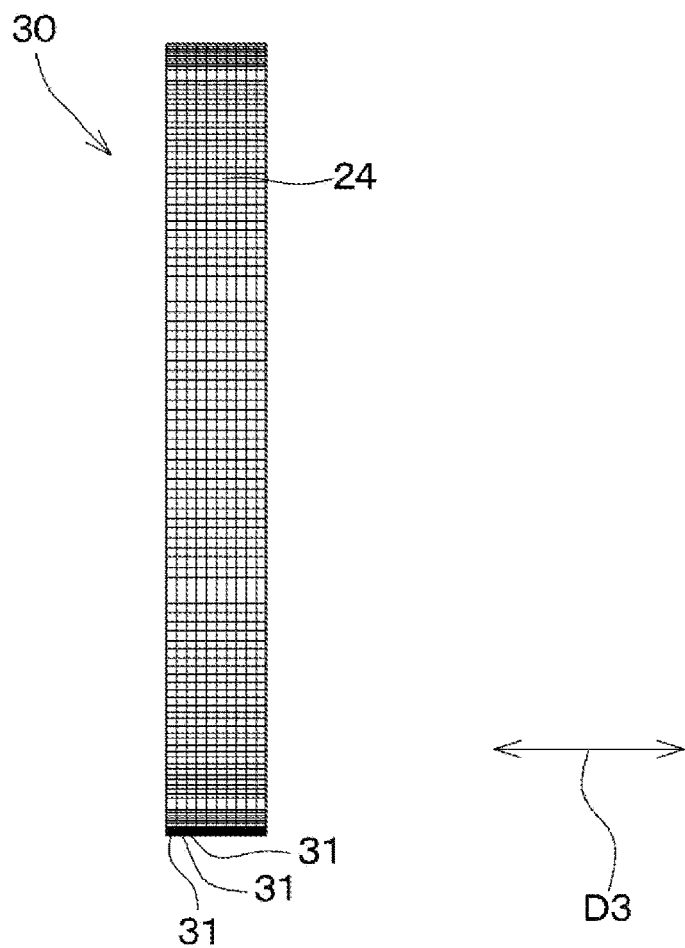
FIG. 8 is a side view of the bonded magnet of FIG. 7.

According to this magnet manufacturing method, it is possible to manufacture a magnet 30, which is shown in FIGS. 7 and 8 and is shaped in a circular ring form. N-poles and S-poles are alternately arranged in a circumferential direction D2 along an outer peripheral surface 30a of the magnet 30. No magnetic pole is formed at an inner peripheral surface 30b of the magnet 30. As shown in FIG. 8, the magnet 30 has a plurality of circular rings 31 which are laminated in an axial direction D3. As shown in FIG. 7, each circular ring 31 includes a plurality of primary constituent portions 32 and a plurality of secondary constituent portions 33, which are alternately arranged in the circumferential direction D2.

Figure 9:
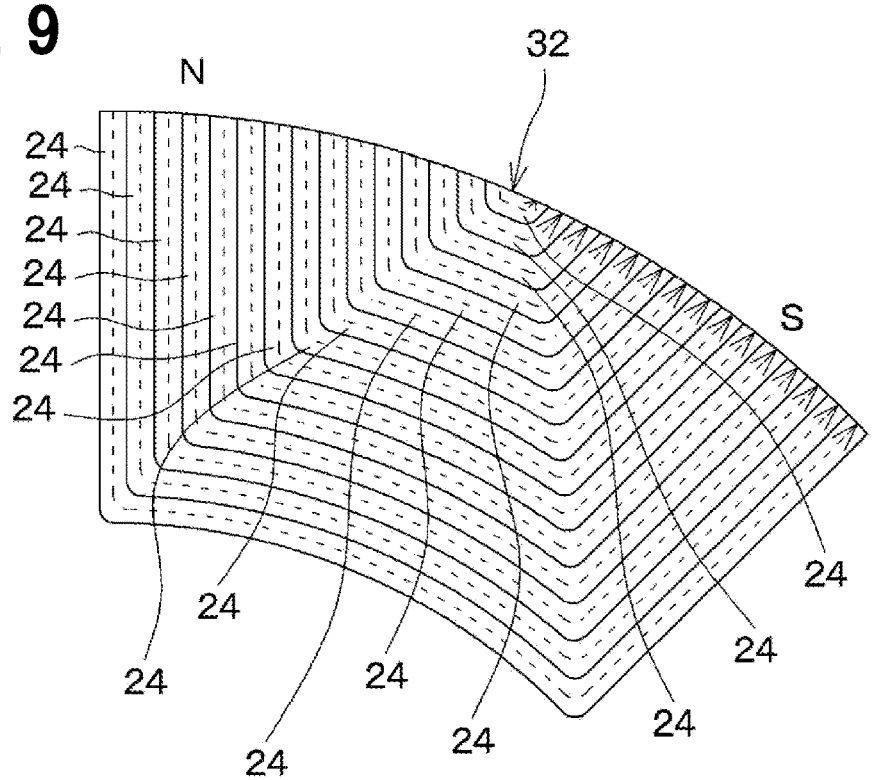
FIG. 9 is a diagram showing arrangement of a plurality of filaments at the time of manufacturing the bonded magnet shown in FIG. 7 by using the magnet manufacturing device of the first embodiment.

At the placing step of placing the filament 24 in the manufacturing of the magnet 30, the filaments 24 are placed such that the primary constituent portion 32 is formed by the filaments 24, as shown in FIG. 9. Each of dotted-line arrows shown in FIG. 9 indicates a trajectory along which the discharge port 132 has moved. By moving the discharge port 132 along a U-shaped path as indicated by the dotted-line arrow in FIG. 9, each of the filaments 24 is arranged in a U-shape. Each of the filaments 24, which form the primary constituent portion 32, is oriented in the common direction. Therefore, the magnetization direction of each of the filaments 24, which form the primary constituent portion 32, is the common direction. An end surface of each drawn filament 24, which is located at a start point (also referred to as a drawing start point) of the drawn filament 24 where the drawing of the filament 24 starts, has the N-polarity. An end surface of each drawn filament 24, which is located at a terminal point (hereinafter also referred to as a drawing terminal point) of the drawn filament 24 where the drawing of the filament 24 ends, has the S-polarity. In this way, the primary constituent portion 32, which has the N-pole and the S-pole at the outer peripheral surface thereof, is formed.

Figure 10:
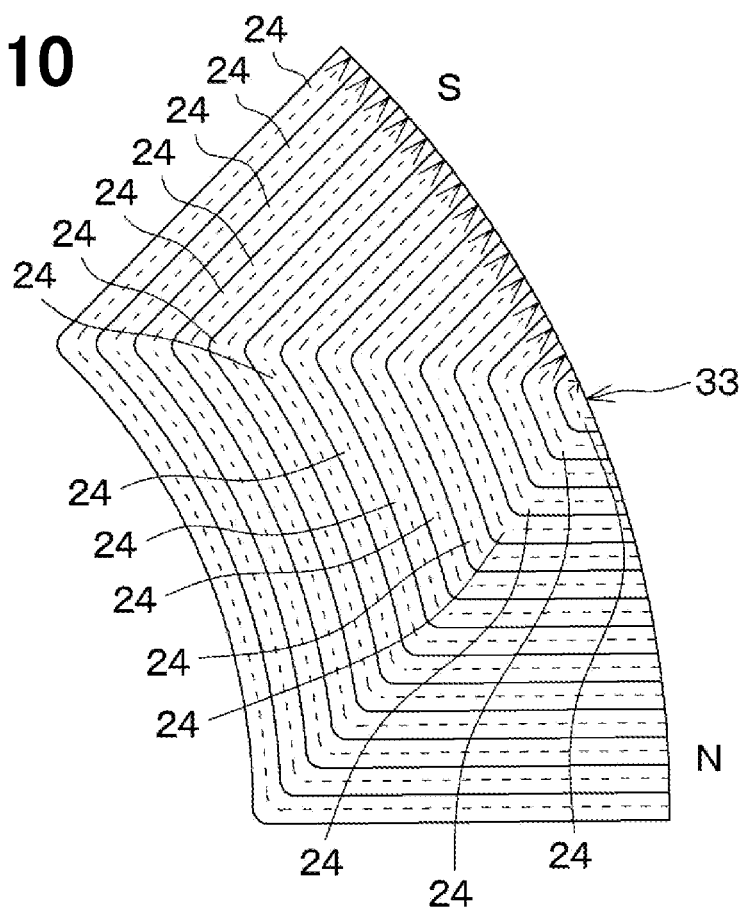
FIG. 10 is a diagram showing arrangement of a plurality of filaments at the time of manufacturing the bonded magnet shown in FIG. 7 by using the magnet manufacturing device of the first embodiment.

Furthermore, the filaments 24 are placed to form the secondary constituent portion 33, as shown in FIG. 10. Each of dotted-line arrows shown in FIG. 10 indicates a trajectory along which the discharge port 132 has moved. By moving the discharge port 132 along a U-shaped path as indicated by the dotted-line arrow in FIG. 10, each of the filaments 24 is arranged in a U-shape. Each of the filaments 24, which form the secondary constituent portion 33, is oriented in the common direction. Therefore, the magnetization direction of each of the filaments 24, which form the secondary constituent portion 33, is the common direction. An end surface of each drawn filament 24, which is located at a start point (also referred to as a drawing start point) of the drawn filament 24 where the drawing of the filament 24 starts, has the N-polarity. An end surface of each drawn filament 24, which is located at a terminal point (also referred to as a drawing terminal point) of the drawn filament 24 where the drawing of the filament 24 ends, has the S-polarity. In the secondary constituent portion 33, the positional relationship between the start point and the terminal point of each filament 24 is reversed from the positional relationship between the start point and the terminal point of each filament 24 in the primary constituent portion 32. In this way, the secondary constituent portion 33, which has the N-pole and the S-pole at the outer peripheral surface thereof, is formed.

By alternately arranging the primary constituent portions 32 and the secondary constituent portions 33 in the circumferential direction D2, one layer of the circular ring 31 is formed. Furthermore, in addition to this circular ring 31, the rest of the circular rings 31 are formed and are stacked in the axial direction D3, so that the magnet 30, which is shaped in the circular ring form shown in FIGS. 7 and 8, is manufactured.

As explained above, in the magnet manufacturing device 10 of the present embodiment, the discharge port 132 of the nozzle 13 is movable in any direction in the three dimensions of space. The filaments 24 on the stage surface 141 are placed to form the arbitrary shape. Therefore, it is possible to mold, i.e., form the magnet into the arbitrary shape. Furthermore, the magnetization direction of the inside of the filament 24 is set to the specific direction, i.e., the direction along the center line of the filament 24. Therefore, by orienting each of the filaments 24 placed on the stage surface 141 in the direction that corresponds to the intended magnetization direction, the magnetization direction of the inside of the magnet becomes the intended direction. Thus, it is possible to manufacture the magnet, in which the shape of the magnet and the magnetization direction of the magnet are arbitrary designed.

The previously proposed magnet manufacturing device discussed above includes the orienting magnet, which orients the magnetic particles, and the magnetizer, which magnetizes the magnetic particles, while the orienting magnet and the magnetizer are separately provided. Therefore, the orienting step of orienting the magnetic particles and the magnetizing step of magnetizing the magnetic particles are separately executed.

In contrast, the magnet manufacturing device 10 of the present embodiment includes the magnetic field application magnet 15 for simultaneously executing the orienting of the magnetic particles 22 and the magnetizing of the magnetic particles 22. Therefore, the orienting step of orienting the magnetic particles 22 and the magnetizing step of magnetizing the magnetic particles 22 are simultaneously executed.

In order to enable free-molding of the magnet, it is necessary to control the movement of the nozzle 13 with high accuracy, like a nozzle of a 3D printer. For that purpose, it is necessary to reduce the size of the nozzle unit. According to the magnet manufacturing device 10 of the present embodiment, the size of the nozzle unit can be reduced in comparison to the case where the orienting magnet and the magnetizer are separately provided to the nozzle 13.

Furthermore, in the case where the orienting step of orienting the magnetic particles and the magnetizing step of magnetizing the magnetic particles are separately executed, the resin material needs to be heated in each of these steps. Thus, in this case, it is necessary to provide two heating regions, in each of which the resin material is heated. According to the magnet manufacturing device 10 of the present embodiment, since the orienting step of orienting the magnetic particles 22 and the magnetizing step of magnetizing the magnetic particles 22 are simultaneously executed, it is only required to provide one heating region, in which the resin material 21 is heated. Thus, the size of the nozzle unit can be reduced.

Furthermore, according to the magnet manufacturing device 10 of the present embodiment, the magnetic field application magnet 15 is a permanent magnet that surrounds all around the outer peripheral surface of the nozzle 13 in the circumferential direction and has the inner peripheral surface 151, the whole of which has the common magnetic polarity. According to this, the nozzle 13 is interposed between the portions of the magnetic field application magnet 15, each of which has the common magnetic polarity, and the entire outer peripheral surface of the nozzle 13 is circumferentially surrounded by the permanent magnet. Therefore, the magnetic field, which has the relatively large magnitude, can be applied to the internal flow passage 131. Thus, it is possible to reduce the size of the magnetic field application magnet 15 which forms the magnetic field that has the required magnitude required for the orienting of the magnetic particles 22 and the magnetizing of the magnetic particles 22.

In the present embodiment, in the transverse cross-section of the magnetic field application magnet 15, the shape of the inner peripheral surface 151 is the circle. However, as long as the inner peripheral surface 151 surrounds all around the outer peripheral surface of the nozzle 13 in the circumferential direction, the shape of the inner peripheral surface 151 may be another shape, such as a polygon, which is other than the circle.

Second Embodiment

Figure 11:
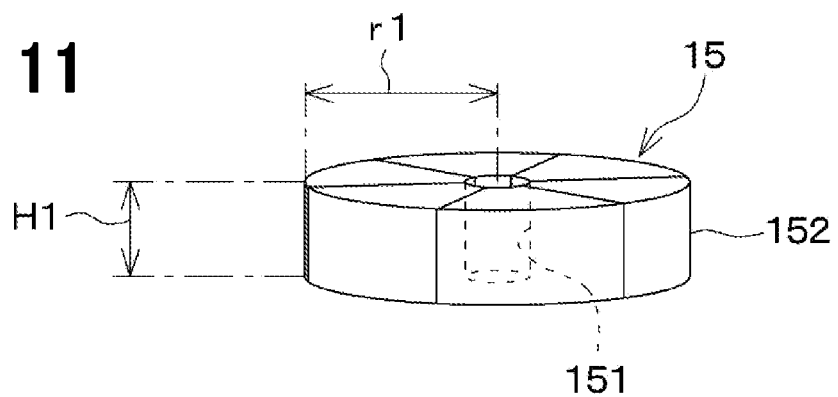
FIG. 11 is a perspective view of a magnetic field application magnet according to a second embodiment.

As shown in FIG. 11, in the magnet manufacturing device 10 of a second embodiment, the shape of the magnetic field application magnet 15 is the same as that of the first embodiment. Unlike the first embodiment, the relationship between the radius r1 and the height H1 of the magnetic field application magnet 15 is H1<r1. The rest of the structure of the magnet manufacturing device 10 is the same as that of the first embodiment. Even in the present embodiment, the advantages, which are similar to those of the first embodiment, can be achieved. However, for the following reason, the relationship between the radius r1 and the height H1 is preferably H1 rather than H1<r1 of the present embodiment.

The inventors of the present application have analyzed the magnitude of the magnetic field in the internal flow passage 131 of the nozzle 13 for each of the case of H1<r1 and the case of H1=r1. A simulation software used for the analysis is "JMAG-Designer" obtained from JSOL Corporation, Tokyo, Japan. The conditions are the same for these two cases except for the relationship between H1 and r1.

Figure 12:
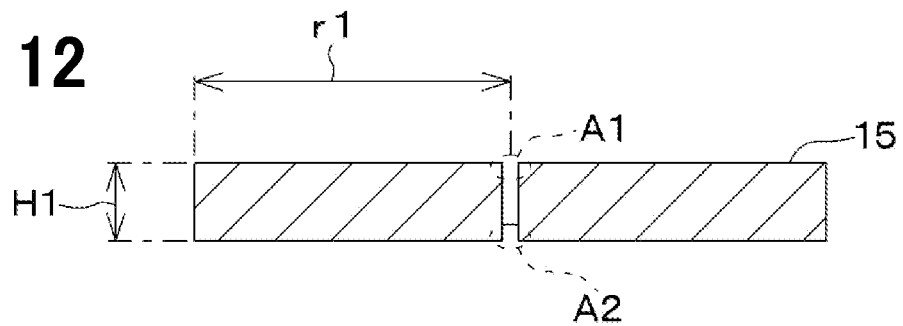
FIG. 12 is a cross-sectional view of the magnetic field application magnet of the second embodiment for explaining a result of a magnetic field analysis.
Figure 13:
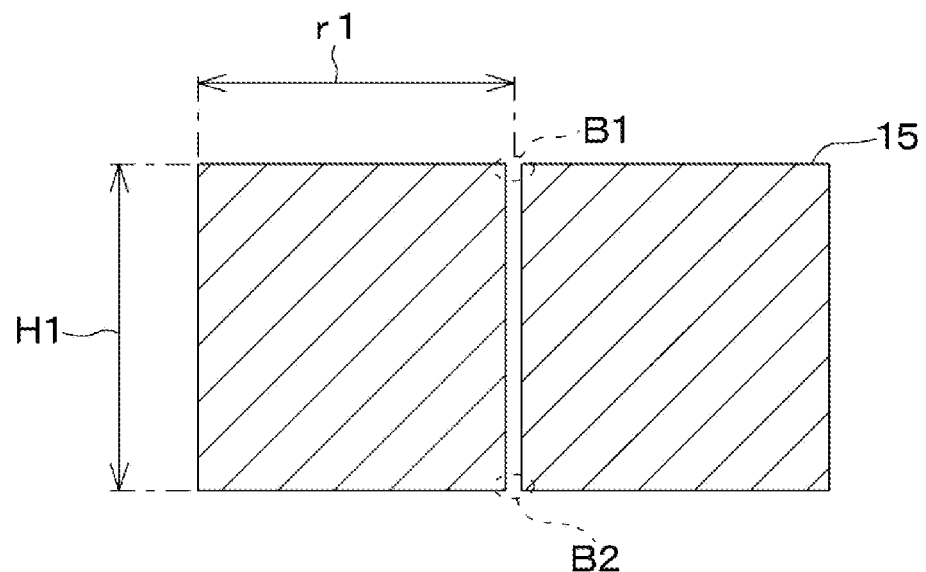
FIG. 13 is a cross-sectional view of the magnetic field application magnet of the first embodiment for explaining a result of a magnetic field analysis.

FIG. 12 is a diagram showing a cross-section of the analyzed magnetic field application magnet 15, which satisfies the relationship of H1<r1. In a case where H1=10 mm and 0=40 mm are set, the magnitude of the magnetic field in regions A1, A2 shown in FIG. 12 is 1.27 T. FIG. 13 is a diagram showing a cross-section of the analyzed magnetic field application magnet 15, which satisfies the relationship of H1=r1. In a case where H1=40 mm and r1=40 mm are set, the magnitude of the magnetic field in regions B1 and B2 shown in FIG. 13 is 1.82 T.

As indicated above, the magnitude of the magnetic field in the case of H1=r1 is larger than the case of H1<r1 if the radius r1 is set to be the same in these two cases. As H1 increases, the length of the magnetic path is increased to increase the magnitude of the magnetic field. Therefore, in the case where the permanent magnets, which are made of the identical material, are respectively used as the magnetic field application magnet 15, by setting the relationship of H1𝑟1 in the one of the permanent magnets, the magnitude of the magnetic field of the internal flow passage 131 can be increased in this permanent magnet in comparison to the other one of the permanent magnets which has the relationship of H1<r1.

Third Embodiment

Figure 14:
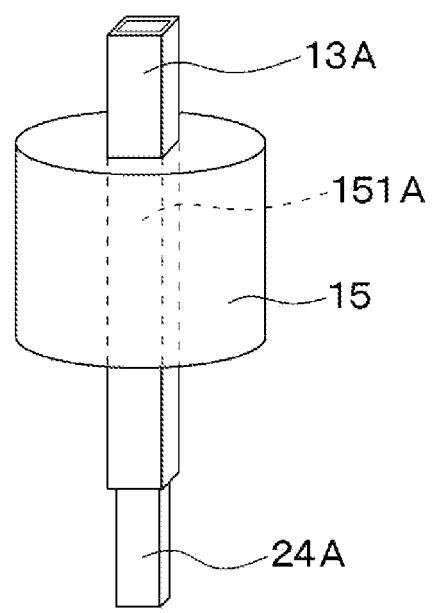
FIG. 14 is a perspective view of a nozzle and a magnetic field application magnet according to a third embodiment.

As shown in FIG. 14, in the magnet manufacturing device 10 of a third embodiment, the shape of the transverse cross-section of the nozzle 13A is different from that of the nozzle 13 of the first embodiment. The transverse cross-section is a cut plane of the nozzle 13A which is perpendicular to the axial direction. The shape of the cross-section of the nozzle 13A is a square. The rest of the structure of the nozzle 13A is the same as that of the nozzle 13 of the first embodiment. A length of one side of the square formed by an inner peripheral surface in the transverse cross-section of the nozzle 13A is 1 mm. The shape of the filament 24A, which is discharged from the discharge port 132 of the nozzle 13A, is a square column. The inner peripheral surface 151A of the magnetic field application magnet 15 has a shape that is the same as an inner peripheral surface of an ordinary square tube having a square transverse cross-section.

Figure 15:
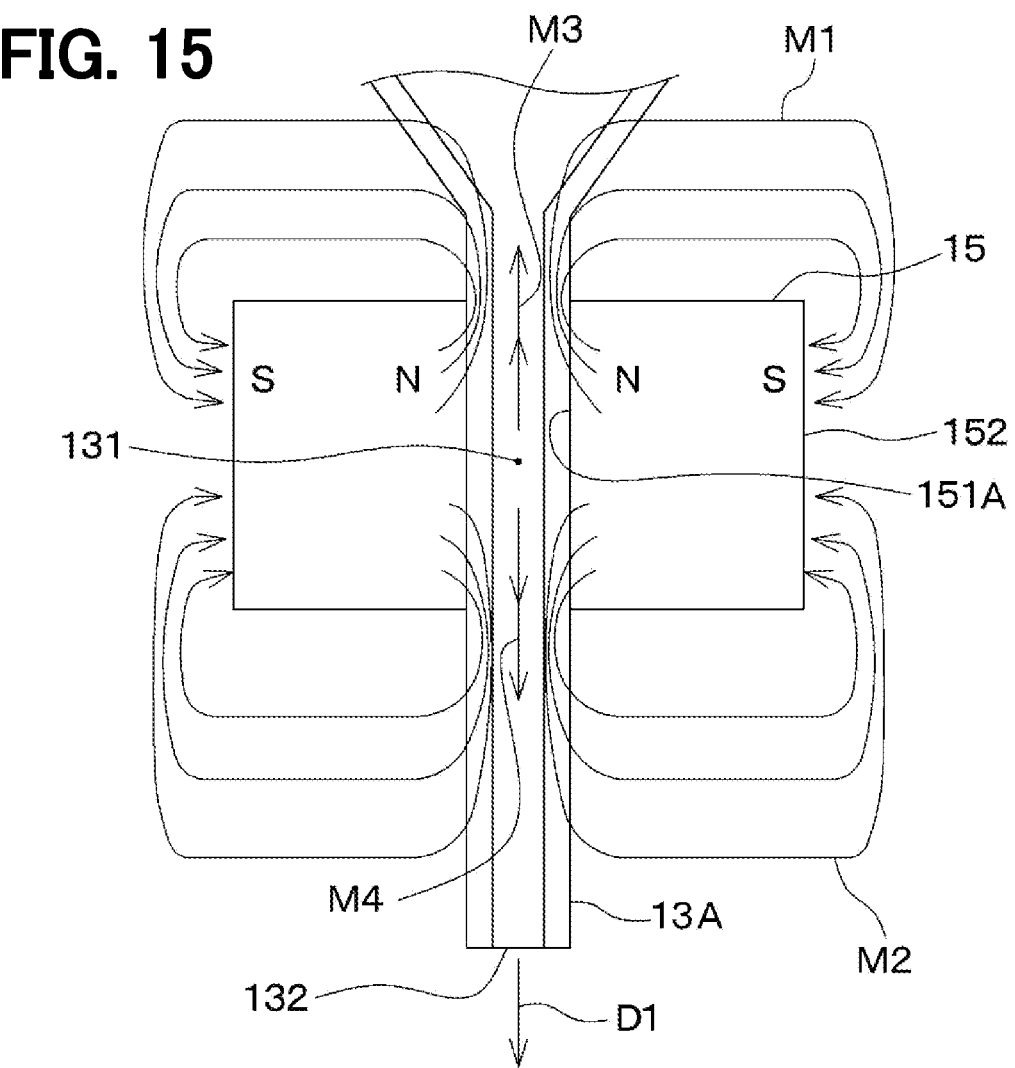
FIG. 15 is a cross-sectional view of the nozzle and the magnetic field application magnet of FIG. 14 taken along a cutting plane which extends along a center line of the nozzle and is parallel with an extending direction of the nozzle.

As shown in FIG. 15, the inner peripheral surface 151A of the magnetic field application magnet 15 contacts the outer peripheral surface of the nozzle 13A. The magnetic polarity of the inner peripheral surface 151A of the magnetic field application magnet 15 is the N-polarity. The magnetic polarity of the outer peripheral surface 152 of the magnetic field application magnet 15 is the S-polarity. Even in the present embodiment, the advantages, which are similar to those of the first embodiment, can be achieved.

Fourth Embodiment

Figure 16:
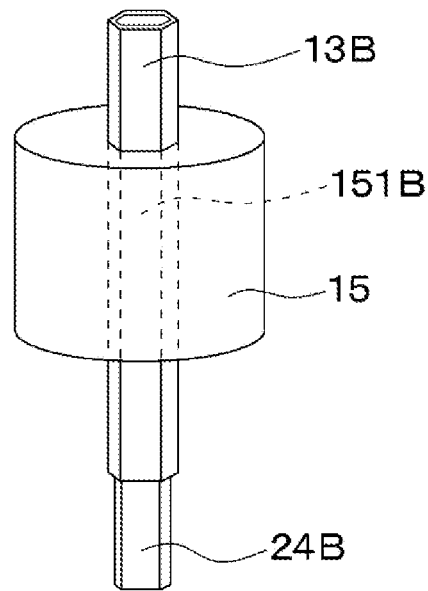
FIG. 16 is a perspective view of a nozzle and a magnetic field application magnet according to a fourth embodiment.

As shown in FIG. 16, in the magnet manufacturing device 10 of a fourth embodiment, the shape of the transverse cross-section of the nozzle 13B is different from that of the nozzle 13 of the first embodiment. The shape of the transverse cross-section of the nozzle 13B is a hexagon. The rest of the structure of the nozzle 13B is the same as that of the nozzle 13 of the first embodiment. A length of a diagonal line of the hexagon formed by the inner peripheral surface in the transverse cross-section of the nozzle 13B is 1 mm. The shape of the filament 24B, which is discharged from the nozzle 13B, is a hexagon column. The inner peripheral surface 151B of the magnetic field application magnet 15 has a shape that is the same as an inner peripheral surface of an ordinary hexagon tube having a hexagon transverse cross-section.

Figure 17:
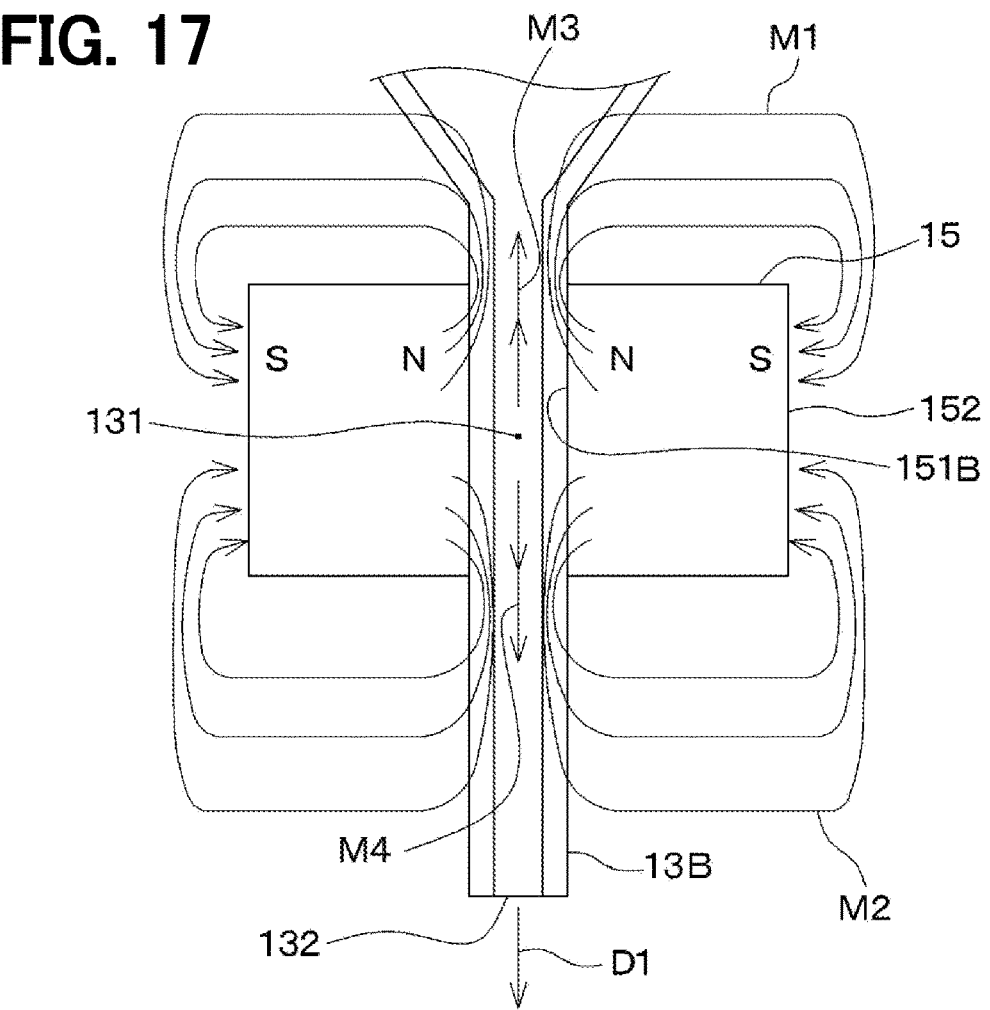
FIG. 17 is a cross-sectional view of the nozzle and the magnetic field application magnet of FIG. 16 taken along a cutting plane which extends along a center line of the nozzle and is parallel with an extending direction of the nozzle.

As shown in FIG. 17, the inner peripheral surface 151B of the magnetic field application magnet 15 contacts the outer peripheral surface of the nozzle 13B. The magnetic polarity of the inner peripheral surface 151B of the magnetic field application magnet 15 is the N-polarity. The magnetic polarity of the outer peripheral surface 152 of the magnetic field application magnet 15 is the S-polarity. The magnetic field, which is formed in the internal flow passage 131 of the nozzle 13B, is the same as that of the first embodiment. Even in the present embodiment, the advantages, which are similar to those of the first embodiment, can be achieved.

Fifth Embodiment

Figure 18:
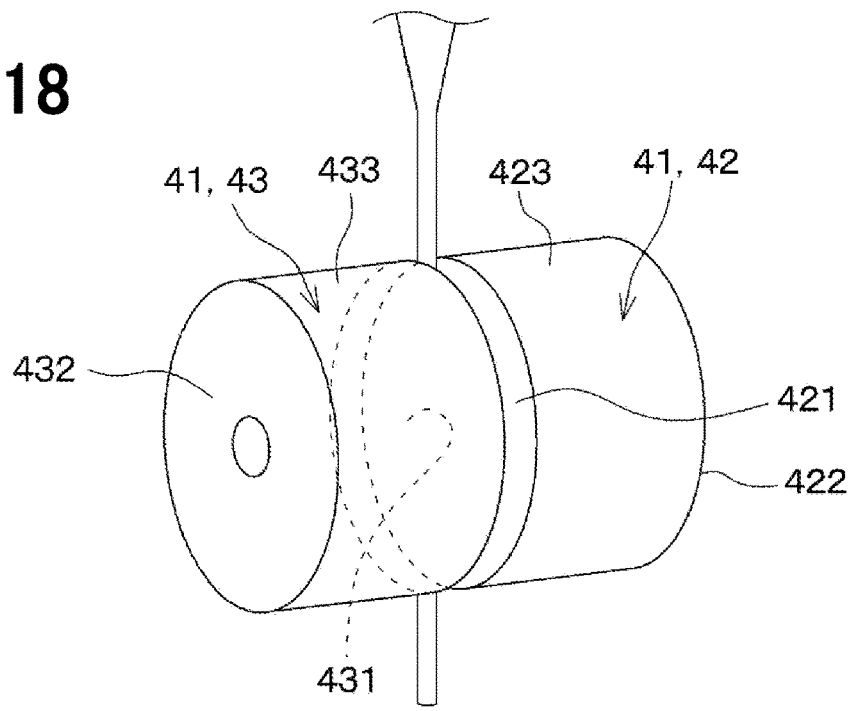
FIG. 18 is a perspective view of a nozzle and a magnetic field application magnet according to a fifth embodiment.
Figure 19:
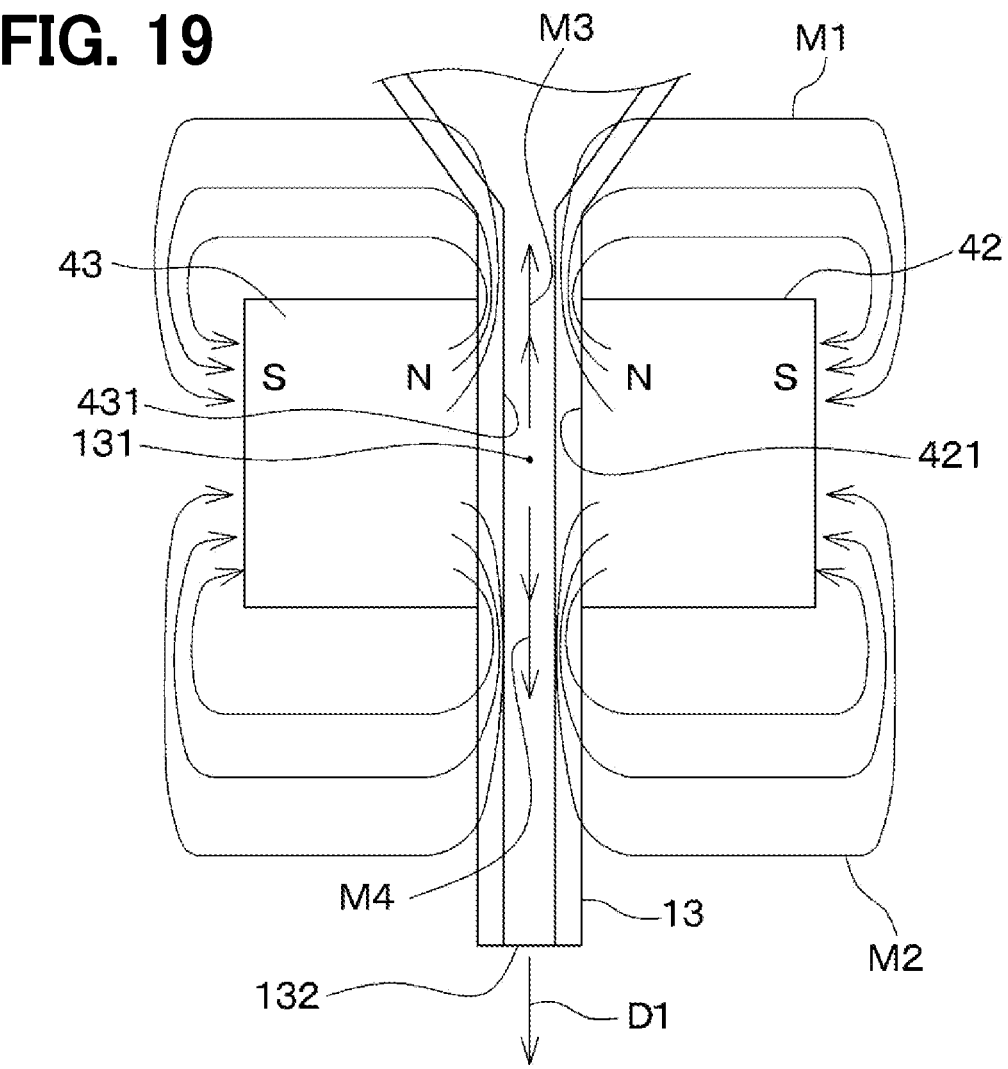
FIG. 19 is a cross-sectional view of the nozzle and the magnetic field application magnet of FIG. 18 taken along a cutting plane which extends along a center line of the nozzle and is parallel with an extending direction of the nozzle.

As shown in FIGS. 18 and 19, in the magnet manufacturing device 10 of a fifth embodiment, a magnetic field application magnet 41 is used as the magnetic field applicator. The magnetic field application magnet 41 includes a first permanent magnet 42 and a second permanent magnet 43.

An outer shape of the first permanent magnet 42 is a cylinder. The first permanent magnet 42 has two flat bottom surfaces 421, 422 and a curved peripheral surface 423. Among the two bottom surfaces 421, 422, one bottom surface 421 has the N-polarity that serves as a first magnetic polarity. Among the two bottom surfaces 421, 422, the other bottom surface 422 has the S-polarity that serves as a second magnetic polarity.

Like the first permanent magnet 42, an outer shape of the second permanent magnet 43 is a cylinder. The second permanent magnet 43 has two flat bottom surfaces 431, 432 and a curved peripheral surface 433. Among the two bottom surfaces 431, 432, one bottom surface 431 has the N-polarity that serves as the first magnetic polarity. Among the two bottom surfaces 431, 432, the other bottom surface 432 has the S-polarity that serves as the second magnetic polarity.

The one bottom surface 421 of the first permanent magnet 42 and the one bottom surface 431 of the second permanent magnet 43 are opposed to each other while the nozzle 13 is interposed between the one bottom surface 421 and the one bottom surface 431. Therefore, the opposed portions (i.e., the one bottom surface 421 and the one bottom surface 431), which are opposed to each other while the nozzle 13 is interposed therebetween, respectively have the common magnetic polarity. The nozzle 13 is placed at a location where the nozzle 13 is opposed to the center of each of the bottom surfaces 421, 431. Therefore, as shown in FIG. 19, like in the first embodiment, even in the case of the magnetic field application magnet 41 of the present embodiment, the magnetic fields M3, M4, which are respectively oriented in the direction along the axial direction of the nozzle 13, can be applied to the internal flow passage 131 of the nozzle 13.

The rest of the structure of the magnet manufacturing device 10 is the same as that of the first embodiment. Therefore, even in the present embodiment, the advantages, which are similar to those of the first embodiment, can be achieved.

Figure 20:
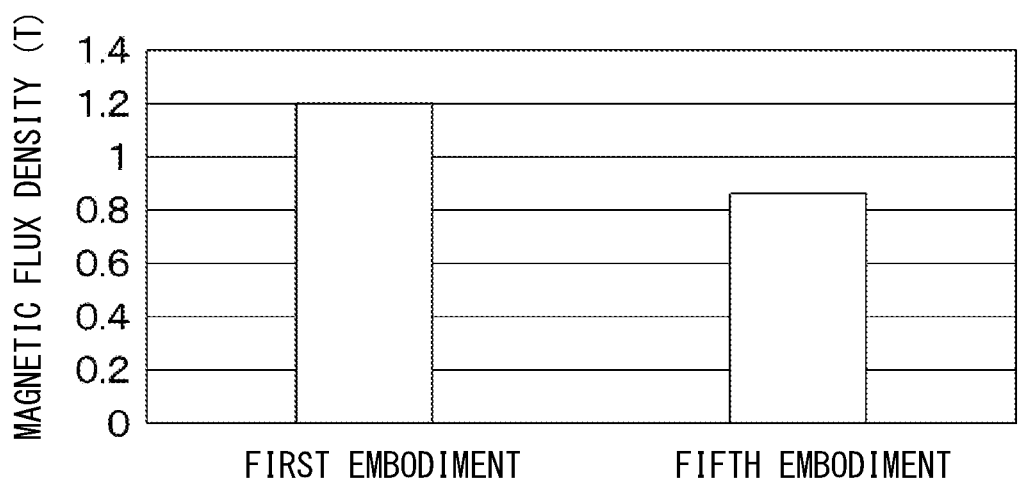
FIG. 20 is a diagram showing a calculated value of a magnetic flux density of a magnetic field applied by the magnetic field application magnet of the first embodiment and a calculated value of a magnetic flux density of a magnetic field applied by the magnetic field application magnet of the fifth embodiment.

Here, FIG. 20 shows a result of a calculation of a magnitude of the magnetic field formed by the magnetic field application magnet 41 of the present embodiment and a result of a calculation of a magnitude of the magnetic field formed by the magnetic field application magnet 15 of the first embodiment while "JMAG-Designer" is used for these calculations. In the calculations, the same material is used for the magnetic field application magnets 15, 41. The magnetic field application magnet 15 has an outer diameter of 9 mm, an inner diameter of 1.5 mm, and a height of 6.4 mm. Each of the first permanent magnet 42 and the second permanent magnet 43 has an outer diameter of 14 mm, an inner diameter of 4 mm, and a height of 18 mm.

As shown in FIG. 20, the magnetic flux density of the magnetic field generated by the magnetic field application magnet 15 of the first embodiment is higher than the magnetic flux density of the magnetic field generated by the magnetic field application magnet 41 of the present embodiment. For this reason, in order to increase the magnitude of the magnetic field applied to the internal flow passage 131, it is preferable to use the magnetic field application magnet 15 of the first embodiment. In the fifth embodiment, although the outer shape of the first and second permanent magnets 42, 43 is the cylinder, this outer shape of the first and second permanent magnets 42, 43 may be any other shape.

Sixth Embodiment

Figure 21:
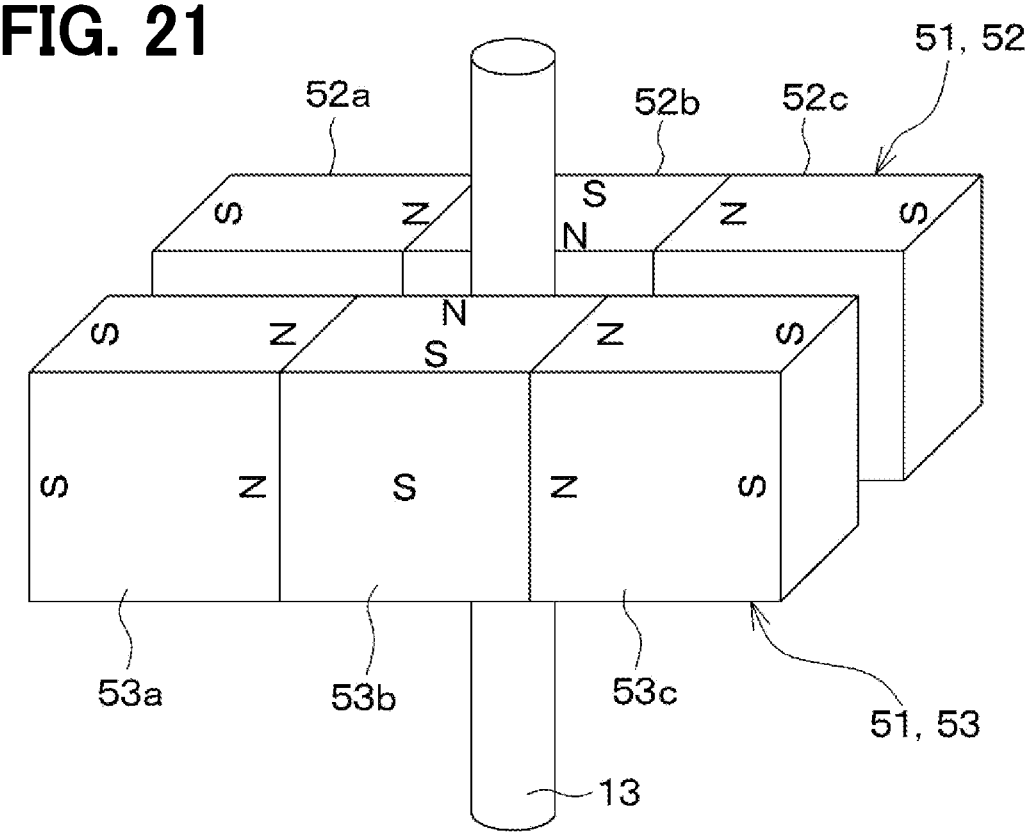
FIG. 21 is a perspective view of a nozzle and a magnetic field application magnet according to a sixth embodiment.
Figure 22:
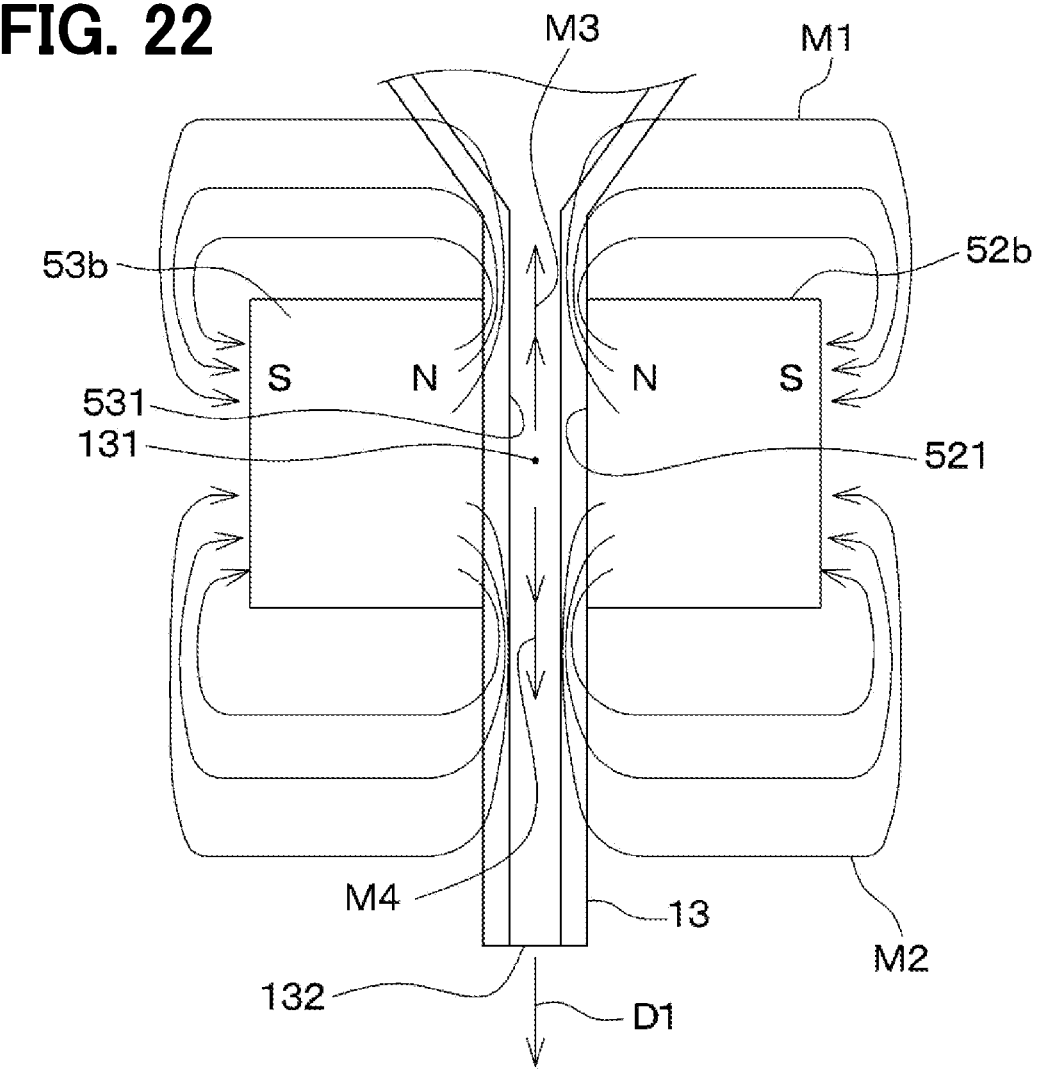
FIG. 22 is a cross-sectional view of the nozzle and the magnetic field application magnet of FIG. 21 taken along a cutting plane which extends along a center line of the nozzle and is parallel with an axial direction of the nozzle.

As shown in FIGS. 21 and 22, in the magnet manufacturing device 10 of a sixth embodiment, the magnetic field application magnet 51 is used as the magnetic field applicator. The magnetic field application magnet 51 includes: a first permanent magnet 52 that has a plurality of magnet segments 52a, 52b, 52c which are arranged in an Halbach array; and a second permanent magnet 53 that has a plurality of magnet segments 53a, 53b, 53c arranged in a Halbach array. The first permanent magnet 52 and the second permanent magnet 53 are respectively located on two opposite sides of the nozzle 13 while the nozzle 13 is interposed between the first permanent magnet 52 and the second permanent magnet 53.

The Halbach array is an arrangement of the permanent magnets that maximizes the magnitude (strength) of the magnetic field in a particular direction by optimizing the orientation of the magnetic poles. In the present embodiment, the magnet segments 52a, 52b, 52c of the first permanent magnet 52 and the magnet segments 53a, 53b, 53c of the second permanent magnet 53 are arranged such that the magnitude (strength) of the magnetic field is maximized in the axial direction of the nozzle 13.

The magnet segments 52a, 52b, 52c of the first permanent magnet 52 are arranged in one direction. The one direction is a direction that intersects the axial direction of the nozzle 13. Magnetization directions of each adjacent two of the magnet segments 52a, 52b, 52c are deviated from each other by a predetermined angle. Although the predetermined angle is 90 degrees in this instance, the predetermined angle may be other than 90 degrees. Likewise, the magnet segments 53a, 53b, 53c of the second permanent magnet 53 are arranged in the one direction. Magnetization directions of each adjacent two of the magnet segments 53a, 53b, 53c are deviated from each other by the predetermined angle. Here, the one direction and the predetermined angle are the same as those of the first permanent magnet 52.

As shown in FIG. 22, one magnet segment 52b among the magnet segments 52a, 52b, 52c of the first permanent magnet 52 has a first magnetic pole surface 521, which has the first magnetic polarity, and one magnet segment 53b among the magnet segments 53a, 53b, 53c of the second permanent magnet 53 has a second magnetic pole surface 531, which has the first magnetic polarity and is opposed to the first magnetic pole surface 521 while the nozzle 13 is interposed between the first magnetic pole surface 521 and the second magnetic pole surface 531. In the present embodiment, the first magnetic polarity is the N-polarity.

Therefore, like in the first embodiment, even in the case of the magnetic field application magnet 51 of the present embodiment, the magnetic fields M3, M4, which are respectively oriented in the direction along the axial direction of the nozzle 13, can be applied to the internal flow passage 131 of the nozzle 13. Furthermore, the magnetic field application magnet 51 of the present embodiment can apply a relatively large magnitude of the magnetic field to the internal flow passage 131.

The rest of the structure of the magnet manufacturing device 10 is the same as that of the first embodiment. Therefore, even in the present embodiment, the advantages, which are similar to those of the first embodiment, can be achieved.

Seventh Embodiment

Figure 23:
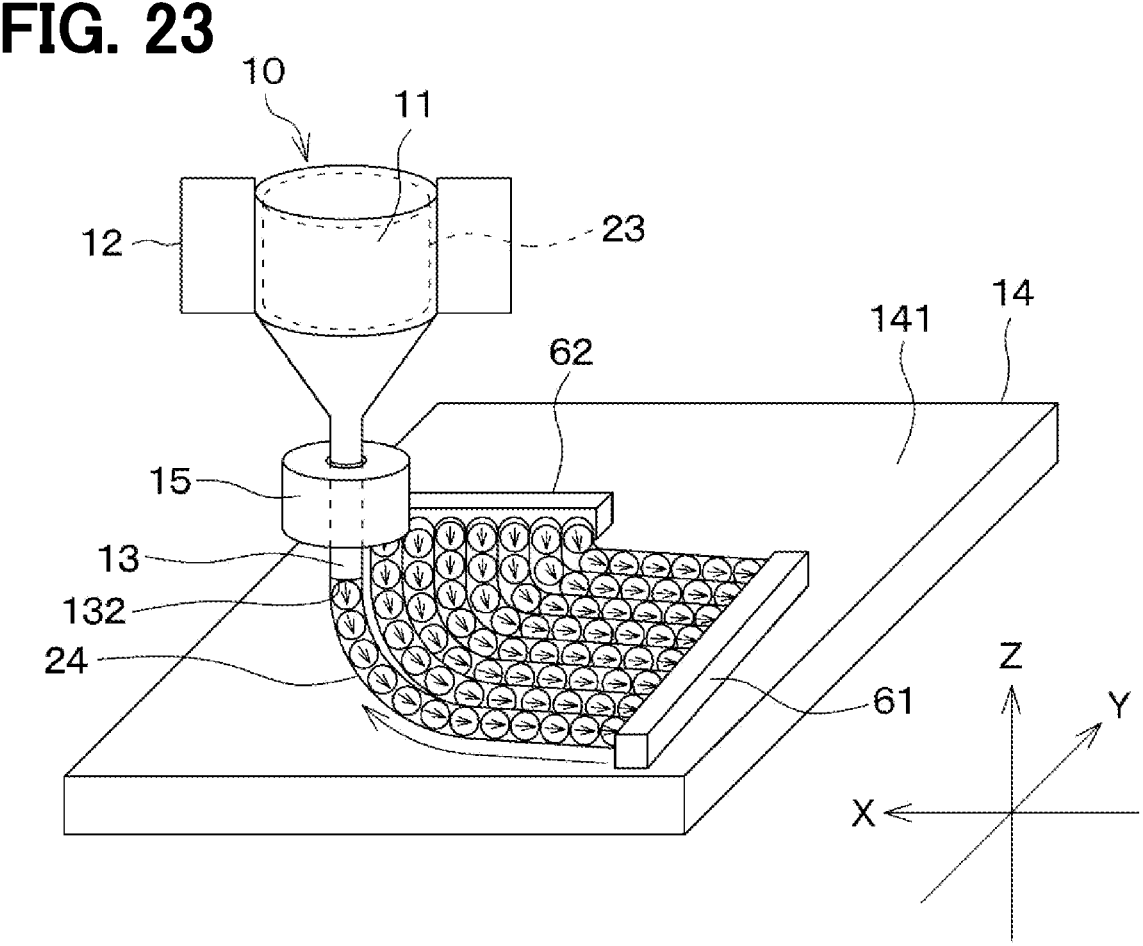
FIG. 23 is a perspective view of a magnet manufacturing device according to a seventh embodiment.
Figure 24:
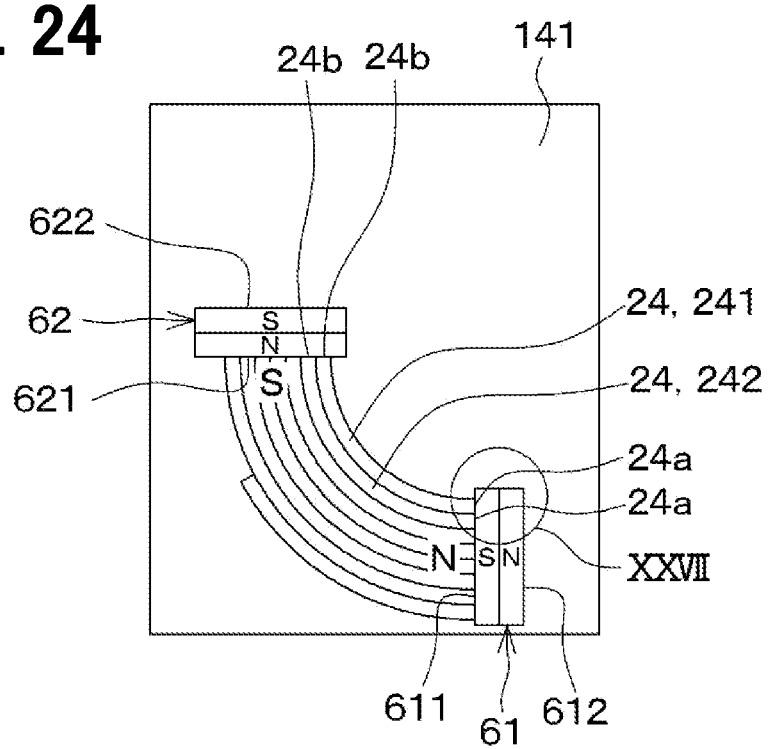
FIG. 24 is a plan view of a stage surface on which a plurality of filaments shown in FIG. 23 are arranged.

As shown in FIG. 23, the magnet manufacturing device 10 of a seventh embodiment includes a first stage magnet 61 and a second stage magnet 62. The first stage magnet 61 and the second stage magnet 62 are stage magnets placed on the stage surface 141. As shown in FIG. 24, the first stage magnet 61 is positioned on the stage surface 141 at a location where the first stage magnet 61 is positioned adjacent to and is opposed to an end surface 24a of the start point of each of the filaments 24 to be drawn on the stage surface 141. The second stage magnet 62 is positioned on the stage surface 141 at a location where the second stage magnet 62 is positioned adjacent to and is opposed to an end surface 24b of the terminal point of each of the filaments 24 to be drawn on the stage surface 141.

As shown in FIG. 23, the filaments 24 are drawn on the stage surface 141 by relatively moving the discharge port 132 with respect to the stage surface 141. Specifically, as shown in FIG. 24, a first filament 241 and a second filament 242, which serve as two of the filaments 24, are drawn such that the first filament 241 and the second filament 242 are placed adjacent to each other and are parallel to each other. At this time, the start point of the first filament 241 to be drawn and the start point of the second filament 242 to be drawn are adjacent to each other, and the terminal point of the first filament 241 to be drawn and the terminal point of the second filament 242 to be drawn are adjacent to each other. The start point is an end portion of the filament 24, at which the drawing of the filament 24 starts. The terminal point is an end portion of the filament 24, at which the drawing of the filament 24 ends. In FIG. 24, the end surface 24a of the start point of each of the first filament 241 and the second filament 242 to be drawn has the N-polarity. The end surface 24b of the terminal point of each of the first filament 241 and the second filament 242 to be drawn has the S-polarity.

As shown in FIG. 24, the first stage magnet 61 is a permanent magnet (shaped in a rod form, more specifically a rectangular rod form in this instance) and has: a surface 611, which has the S-polarity; and a surface 612, which has the N-polarity. The surface 611, which has the S-polarity, is located at one side of the first stage magnet 61 in one direction. The surface 612, which has the N-polarity, is located at the other side of the first stage magnet 61 in the one direction. The first stage magnet 61 is prepositioned on the stage surface 141 such that the surface 611 of the first stage magnet 61, which has the S-polarity, is opposed to the end surface 24a of the start point of each of the first filament 241 and the second filament 242 to be drawn. The surface 611 of the first stage magnet 61, which has the S-polarity, is a surface that has the magnetic polarity which is different from the magnetic polarity of the end surface 24a of the start point.

The second stage magnet 62 is a permanent magnet (shaped in a rod form, more specifically a rectangular rod form in this instance) and has: a surface 621, which has the N-polarity; and a surface 622, which has the S-polarity. The surface 621, which has the N-polarity, is located at one side of the second stage magnet 62 in one direction. The surface 622, which has the S-polarity, is located at the other side of the second stage magnet 62 in the one direction. The second stage magnet 62 is prepositioned on the stage surface 141 such that the surface 621 of the second stage magnet 62, which has the N-polarity, is opposed to the end surface 24b of the terminal point of each of the first filament 241 and the second filament 242 to be drawn. The surface 621 of the second stage magnet 62, which has the N-polarity, is a surface that has the magnetic polarity which is different from the magnetic polarity of the end surface 24b of the terminal point.

Like the first embodiment, the magnet manufacturing method of the present embodiment includes a melting step of melting the resin material 21, an orienting and magnetizing step of orienting and magnetizing the respective magnetic particles 22, and a placing step of placing the filament 24. The melting step of melting the resin material 21 and the orienting and magnetizing step of orienting and magnetizing the respective magnetic particles 22 are the same as those of the first embodiment.

In the placing step of placing the filament 24, in the state where the first stage magnet 61 and the second stage magnet 62 are placed on the stage surface 141, the plurality of filaments 24 are drawn on the stage surface 141 from the first stage magnet 61 toward the second stage magnet 62. At this time, each of the filaments 24 is placed such that the adjacent filaments 241, 242, which are arranged parallel to each other and are drawn along an arc, and the adjacent filaments 241, 242 are in contact with each other. The example of the adjacent filaments 241, 242 is illustrated as the first filament 241 and the second filament 242.

The end surface 24a of the filament 24 is formed at the start point of the drawing of the filament 24 on the stage surface 141. At the terminal point of the drawing of the filament 24 on the stage surface 141, the filament 24 is cut to form the end surface 24b of the terminal point of the filament 24. Therefore, each of the filaments 24 has the end surface 24a of the start point and the end surface 24b of the terminal point. The end surfaces 24a of the start points of the adjacent filaments 241, 242 are placed adjacent to each other. The end surfaces 24b of the terminal points of the adjacent filaments 241, 242 are placed adjacent to each other.

Figure 25:
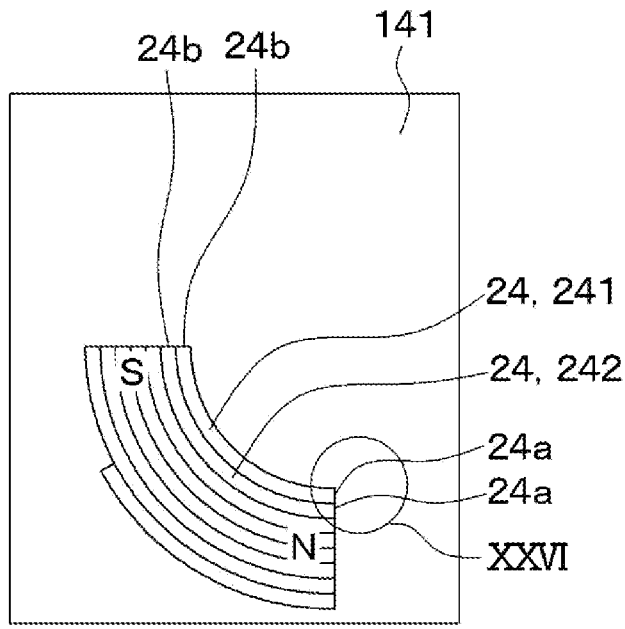
FIG. 25 is a plan view of the stage surface when a plurality of filaments are arranged without placing a first stage magnet and a second stage magnet on the stage surface.

Now, with reference to FIG. 25, there will be described a case where the plurality of filaments 24 are placed on the stage surface 141 in a state where the first stage magnet 61 and the second stage magnet 62 are not placed on the stage surface 141 unlike the present embodiment. The shape of the respective filaments 24, which are placed on the stage surface 141, is the same as that of the present embodiment.

Figure 26:
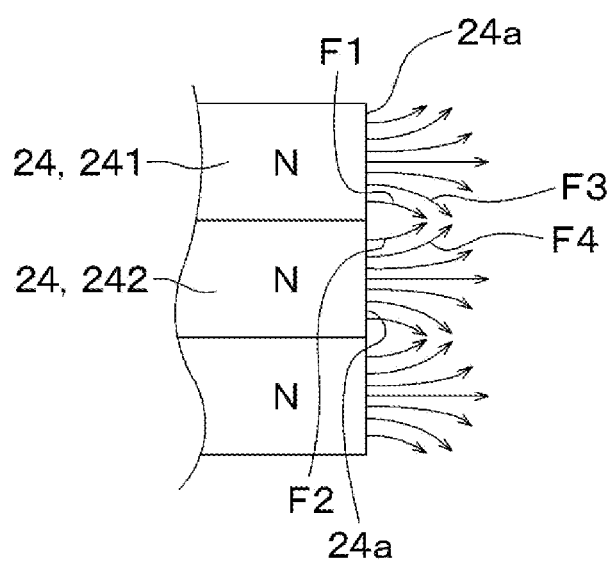
FIG. 26 is an enlarged view of area XXVI in FIG. 25.

In this case, as shown in FIG. 26, at the adjacent filaments 241, 242 among the plurality of filaments 24, the direction of the magnetic flux, which is directed outward from the end surface 24a of the start point of one of the adjacent filaments 241, 242, and the direction of the magnetic flux, which is directed outward from the end surface 24a of the start point of the other one of the adjacent filaments 241, 242, are opposed to each other. The arrows in FIG. 26 indicate the magnetic fluxes. For example, the direction of the magnetic flux F1 of the first filament 241 and the direction of the magnetic flux F2 of the second filament 242 are opposed to each other. The direction of the magnetic flux F3 of the first filament 241 and the direction of the magnetic flux F4 of the second filament 242 are opposed to each other. Therefore, the adjacent filaments 241, 242 repel each other.

At the drawing start point, in a case where the magnetic particles interact with each other before sufficiently solidifying the resin material, the bonding between the adjacent filaments 241, 242 may become insufficient, and a gap may be formed between the adjacent filaments 241, 242. Also, even when the adjacent filaments 241, 242 are bonded with each other, the orientation of the magnetic particles may be disordered.

Furthermore, although not depicted in any of the figures, like the drawing start point, at the drawing terminal point, the adjacent filaments 241, 242 may repel each other to cause the bonding failure between the adjacent filaments 241, 242 and the disorder in the orientation of the magnetic particles.

Figure 27:
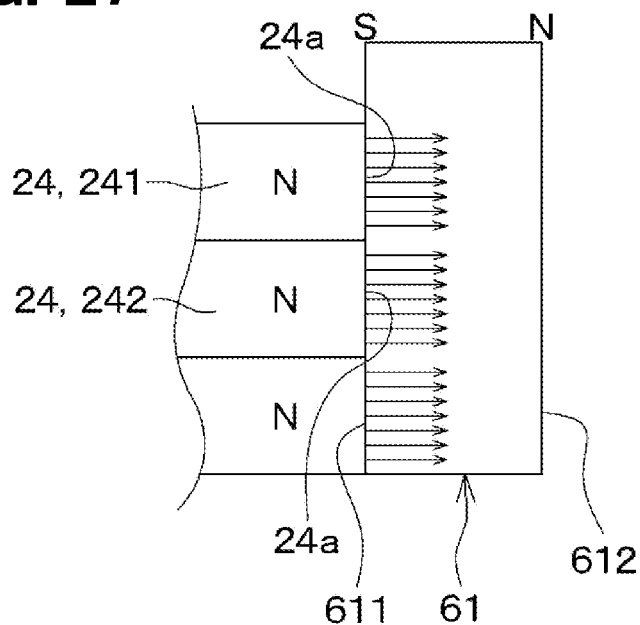
FIG. 27 is an enlarged view of area XXVII in FIG. 24.

In contrast, according to the present embodiment, as shown in FIG. 27, at the drawing start point, the magnetic fluxes, which are directed outward from the end surfaces 24a of the filaments 24, are magnetically attracted toward the S-polarity of the first stage magnet 61 and thereby become parallel to each other. The arrows in FIG. 27 indicate the magnetic fluxes. This state is maintained until the resin material is solidified. Therefore, the repulsion between the adjacent filaments 241, 242 can be avoided. Once the thermoplastic resin material is cooled and is solidified, the orientation of the magnetic particles is fixed. Therefore, even when the filaments 24 are separated from the first stage magnet 61, the orientation of the magnetic particles is not disordered.

Furthermore, although not depicted in any of the figures, even at the drawing terminal point, like the drawing start point, the magnetic fluxes, which are directed outward from the end surfaces 24b of the filaments 24, are magnetically attracted toward the N-polarity of the second stage magnet 62 and thereby become parallel to each other. Therefore, the repulsion between the adjacent filaments 241, 242 can be avoided. At the drawing terminal point, the orientation of the magnetic particles is disordered once at the time of cutting the filament 24. However, since the magnetic flux, which is directed outward from the end surface 24b, is magnetically attracted toward the N-polarity of the second stage magnet 62, the magnetic particles can be returned to the oriented state, and thereby the orientation of the magnetic particles can be maintained.

As discussed above, according to the present embodiment, the degree of orientation of the magnetic particles of the manufactured magnet can be improved. Here, it should be noted that the magnet manufacturing device 10 may include only one of the first stage magnet 61 and the second stage magnet 62. Also, each of the first stage magnet 61 and the second stage magnet 62 may be an electromagnet instead of the permanent magnet.

Eighth Embodiment

Figure 28:
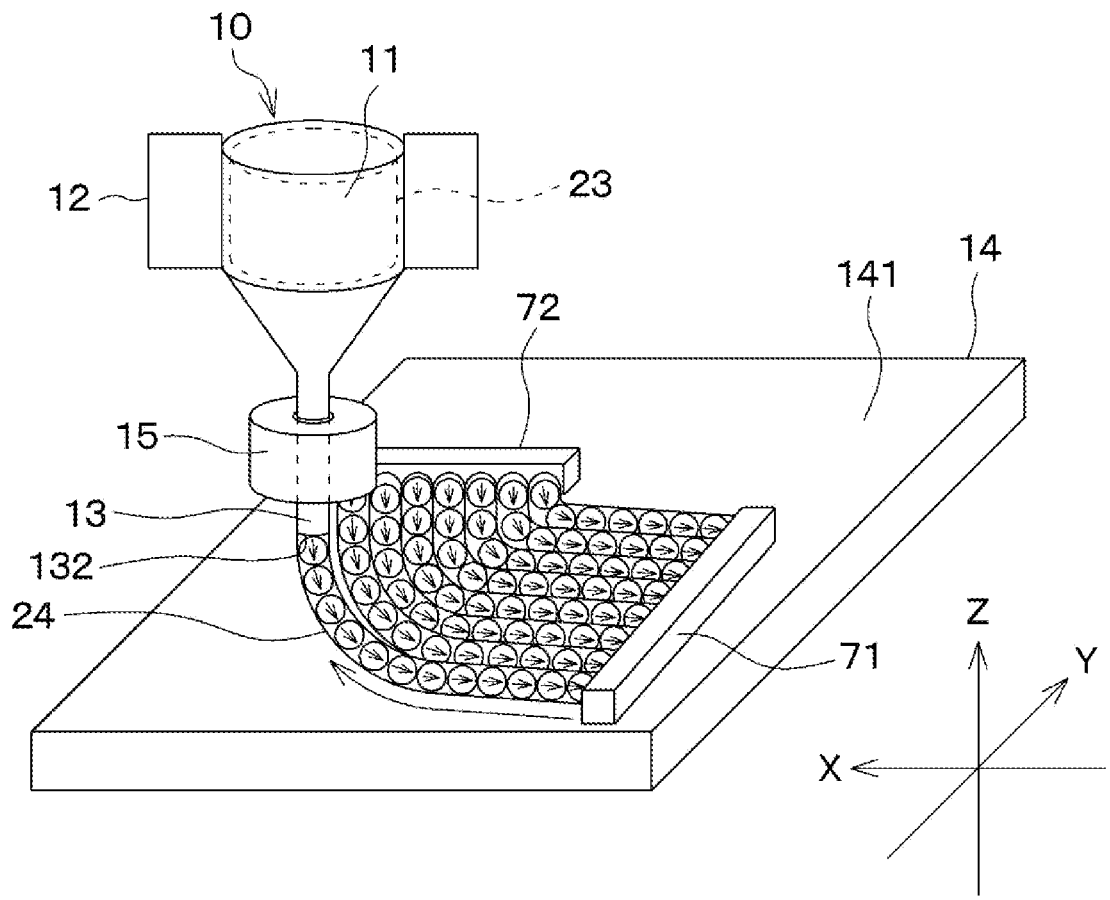
FIG. 28 is a perspective view of a magnet manufacturing device according to an eighth embodiment.
Figure 29:
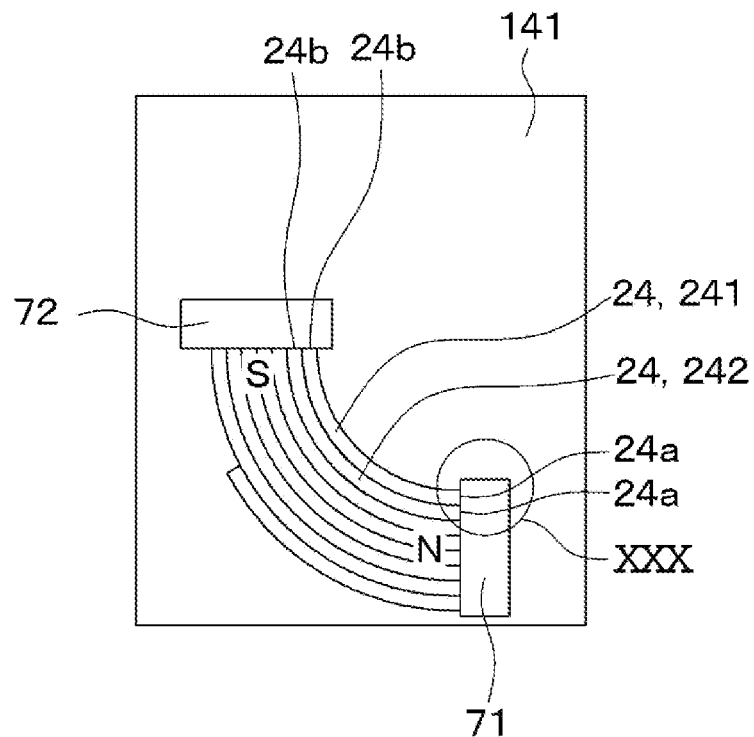
FIG. 29 is a plan view of a stage surface on which a plurality of filaments shown in FIG. 28 are arranged.

As shown in FIG. 28, the magnet manufacturing device 10 of an eighth embodiment includes a first soft magnetic material 71 and a second soft magnetic material 72. Each of the first soft magnetic material 71 and the second soft magnetic material 72 is a soft magnetic material (shaped in a rod form, more specifically a rectangular rod form in this instance) placed on the stage surface 141. The soft magnetic material may be, for example, iron. As shown in FIG. 29, the first soft magnetic material 71 is positioned on the stage surface 141 at a location where the first soft magnetic material 71 is positioned adjacent to and is opposed to the end surface 24a of the start point of each of the filaments 24 to be drawn on the stage surface 141. The second soft magnetic material 72 is positioned on the stage surface 141 at a location where the second soft magnetic material 72 is positioned adjacent to and is opposed to the end surface 24b of the terminal point of each of the filaments 24 to be drawn on the stage surface 141. The shape of the respective filaments 24 to be drawn is the same as that of the seventh embodiment.

Specifically, the first soft magnetic material 71 is prepositioned on the stage surface 141 such that the first soft magnetic material 71 is opposed to the end surface 24a of the start point of each of the first filament 241 and the second filament 242 to be drawn. The second soft magnetic material 72 is prepositioned on the stage surface 141 such that the second soft magnetic material 72 is opposed to the end surface 24b of the terminal point of each of the first filament 241 and the second filament 242 to be drawn.

The end surfaces 24a of the start points of the filaments 24 to be drawn are aligned in one direction (hereinafter referred to as an aligning direction). The first soft magnetic material 71 extends in the aligning direction, in which the end surfaces 24a of the start points of the filaments 24 are aligned. The end surfaces 24b of the terminal points of the filaments 24 are aligned in another direction (hereinafter also referred to as the other aligning direction). The second soft magnetic material 72 extends in the other aligning direction, in which the end surfaces 24b of the terminal points of the filaments 24 are aligned.

Figure 30:
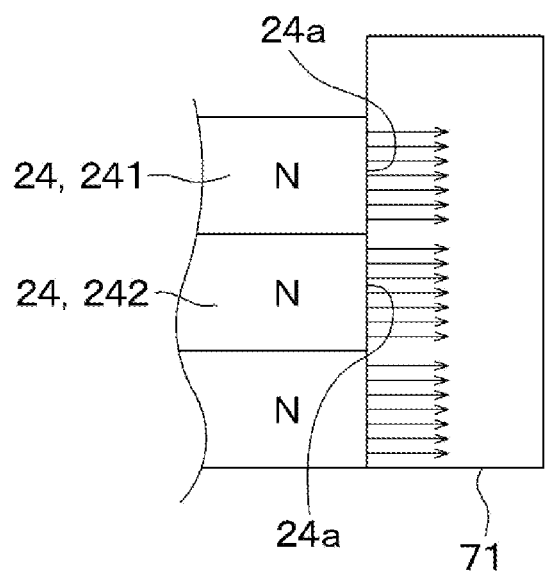
FIG. 30 is an enlarged view of area XXX in FIG. 29.

Like the seventh embodiment, according to the present embodiment, as shown in FIG. 30, at the drawing start point, the magnetic fluxes, which are directed outward from the end surfaces 24a of the filaments 24, are magnetically attracted toward the first soft magnetic material 71 and thereby become parallel to each other. The arrows in FIG. 30 indicate the magnetic fluxes. This state is maintained until the resin material is solidified. Therefore, the repulsion between the adjacent filaments 241, 242 can be avoided.

Furthermore, although not depicted in any of the figures, even at the drawing terminal point, the magnetic fluxes, which are directed outward from the end surfaces 24b of the filaments 24, are magnetically attracted toward the second soft magnetic material 72 and thereby become parallel to each other. Therefore, the repulsion between the adjacent filaments 241, 242 can be avoided. At the drawing terminal point, the orientation of the magnetic particles is disordered once at the time of cutting the filament 24. However, the magnetic fluxes, which are direction outward from the end surfaces 24b, are magnetically attracted to the second soft magnetic material 72, and thereby the orientation of the magnetic particles can be ordered and maintained.

Here, it should be noted that the magnet manufacturing device 10 may include only one of the first soft magnetic material 71 and the second soft magnetic material 72.

Ninth Embodiment

Figure 31:
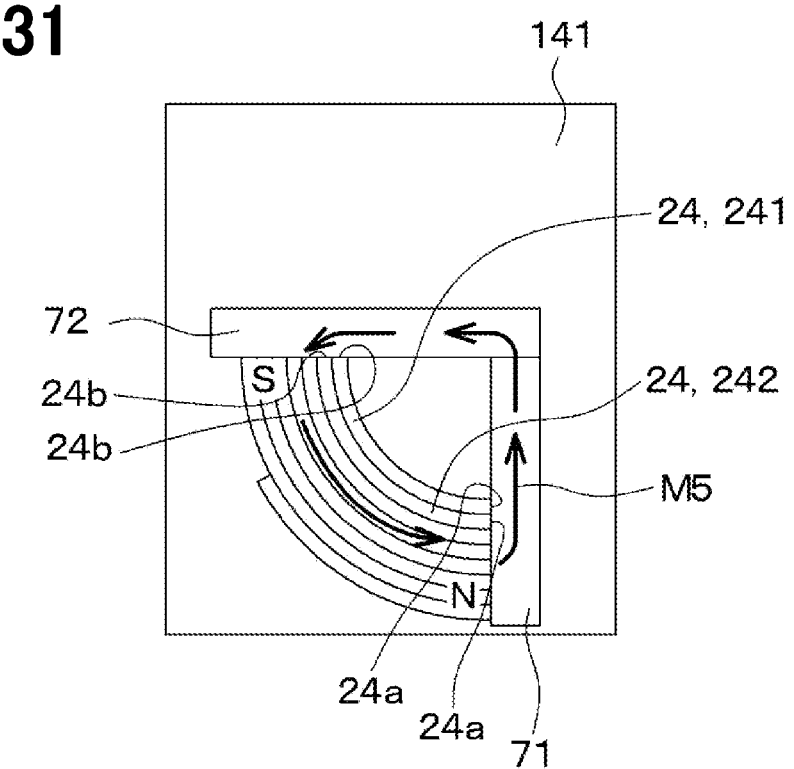
FIG. 31 is a plan view of a stage surface on which a plurality of filaments are arranged according to a ninth embodiment.

As shown in FIG. 31, the magnet manufacturing device 10 of a ninth embodiment includes the first soft magnetic material 71 and the second soft magnetic material 72 like the magnet manufacturing device 10 of the eighth embodiment. However, unlike the magnet manufacturing device 10 of the eighth embodiment, the first soft magnetic material 71 and the second soft magnetic material 72 are arranged in an L-shape. An end portion of the first soft magnetic material 71 in the longitudinal direction thereof and an end portion of the second soft magnetic material 72 in the longitudinal direction thereof contact with each other. As discussed above, the first soft magnetic material 71 and the second soft magnetic material 72 are coupled with each other at the location that is remote from the end surfaces 24a of the start points and the end surface 24b of the terminal points of the filaments 24. The rest of the structure of the magnet manufacturing device 10 is the same as that of the eighth embodiment. Even in the present embodiment, the advantages, which are similar to those of the eighth embodiment, can be achieved.

In the eighth embodiment, the first soft magnetic material 71 and the second soft magnetic material 72 are not coupled together, i.e., do not contact with each other. Therefore, the attracting effect of the first soft magnetic material 71 and the second soft magnetic material 72 of the eighth embodiment for magnetically attracting the magnetic flux is lower than the attracting effect of the first stage magnet 61 and the second stage magnet 62 of the seventh embodiment for magnetically attracting the magnetic flux.

In contrast, in the present embodiment, the first soft magnetic material 71 and the second soft magnetic material 72 are coupled together, i.e., contact with each other. Therefore, as shown in FIG. 31, a magnetic circuit M5, in which the magnetic flux flows through the drawn filaments 24, the first soft magnetic material 71 and the second soft magnetic material 72, is formed. Therefore, in comparison to the case where the first soft magnetic material 71 and the second soft magnetic material 72 are not coupled together, i.e., do not contact with each other, the attracting effect for attracting the magnetic flux from the end surfaces 24a, 24b of the filaments 24 can be enhanced.

Figure 32:
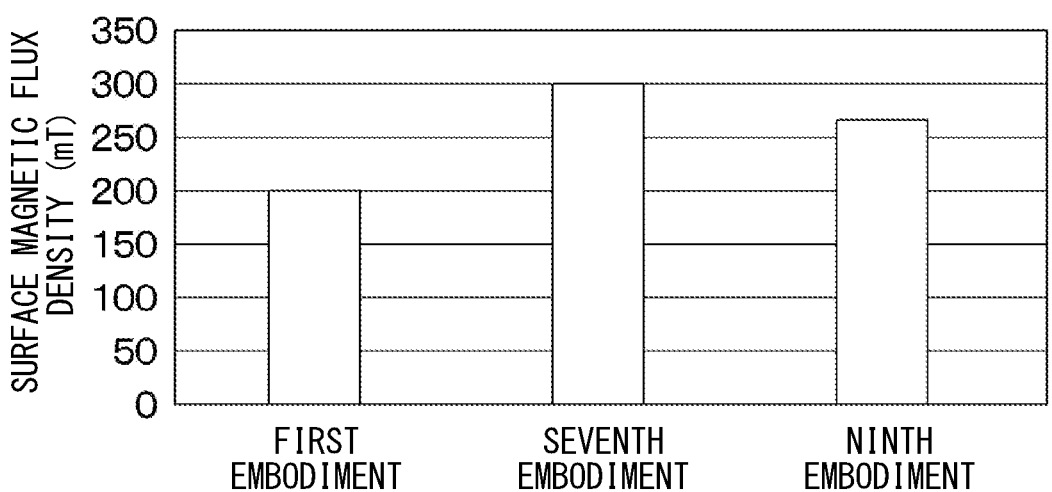
FIG. 32 is a diagram indicating a measurement result of a surface magnetic flux density at a start point of a plurality of filaments arranged on the stage surface for each of the magnets respectively manufactured by the magnet manufacturing devices of the first, seventh and ninth embodiments.

The inventors of the present application have manufactured the magnet shown in FIG. 23 by using the magnet manufacturing device 10 of each of the first, seventh and ninth embodiments and have measured a surface magnetic flux density of the magnet with a tesla meter. FIG. 32 shows a result of this measurement.

The first embodiment shown in FIG. 32 indicates the surface magnetic flux density of the magnet manufactured by using the magnet manufacturing device 10 of the first embodiment. In the magnet manufacturing device 10 of the first embodiment, neither the magnet nor the soft magnetic material is placed on the stage surface 141. The seventh embodiment shown in FIG. 32 indicates the surface magnetic flux density of the magnet manufactured by using the magnet manufacturing device 10 of the seventh embodiment. In the magnet manufacturing device 10 of the seventh embodiment, the first and second stage magnets 61, 62 are placed on the stage surface 141. The ninth embodiment shown in FIG. 32 indicates the surface magnetic flux density of the magnet manufactured by using the magnet manufacturing device 10 of the ninth embodiment. In the magnet manufacturing device 10 of the ninth embodiment, the first and second soft magnetic materials 71, 72 are placed on the stage surface 141.

The manufacturing conditions of the magnet using the magnet manufacturing device 10 of the first, seventh and ninth embodiments are the same except for the presence or absence of the first and second stage magnets 61, 62 or the first and second soft magnetic materials 71, 72 on the stage surface 141. The magnetic field application magnet 15 is the Nd—Fe—B anisotropic sintered magnet. The resin material 21 of the mixture 23, which is used in this study, is the polycaprolactone. The magnetic particles 22, which are used in this study, are the Sm—Fe—N magnetic particles. A ratio between the magnetic particles 22 and the resin material 21 is as follows: the magnetic particles: the resin material=60 vol %: 40 vol %.

As shown in FIG. 32, the surface magnetic flux density of the magnet using the magnet manufacturing device 10 of the seventh embodiment and the surface magnetic flux density of the magnet using the magnet manufacturing device 10 of the ninth embodiment are higher than the surface magnetic flux density of the magnet using the magnet manufacturing device 10 of the first embodiment. This confirms that the magnetic flux density of the manufactured magnet can be increased by placing the stage magnets or the soft magnetic materials on the stage surface 141.

Other Embodiments (1) In each of the above embodiments, the stage 14 is immovable, and the nozzle 13 is movable. Therefore, the discharge port 132 is relatively movable with respect to the stage surface 141 in any direction (arbitrary direction) in the three dimensions of space. Alternatively, the nozzle 13 may be immovable, and the stage 14 may be movable. In this way, the discharge port 132 is relatively movable with respect to the stage surface 141 in any direction (arbitrary direction) in the three dimensions of space. Further alternatively, both of the nozzle 13 and the stage 14 may be movable. In this way, the discharge port 132 is relatively movable with respect to the stage surface 141 in any direction (arbitrary direction) in the three dimensions of space.

(2) In each of the above embodiments, the magnetic polarity of the one side of the magnetic field application magnet 15, 41, which is located on the nozzle 13 side, is the N-polarity, and the magnetic polarity of the other side of the magnetic field application magnet 15, 41, which is opposite to the nozzle 13, is the S-polarity. This may be reversed such that the magnetic polarity of the one side of the magnetic field application magnet 15, 41, which is located on the nozzle 13 side, is the S-polarity, and the magnetic polarity of the other side of the magnetic field application magnet 15, 41, which is opposite to the nozzle 13, is the N-polarity.

(3) In each of the above embodiments, the magnetic field application magnet 15, 41, 51 is the permanent magnet but may be an electromagnet.

(4) The present disclosure is not limited to the above-described embodiments, and each of the above-described embodiments may be changed as appropriate within the scope of the present disclosure, and the present disclosure may include various modifications and modifications within an equivalent range. Further, the above embodiments are not unrelated to each other and can be appropriately combined unless the combination is clearly impossible. Needless to say, in each of the above-described embodiments, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the material, the shape, the positional relationship or the like of the constituent elements of the embodiment is mentioned, the present disclosure should not be limited the material, the shape, the positional relationship or the like unless it is clearly stated that it is essential and/or it is required in principle.

What is claimed is:

1. A magnet manufacturing device comprising:
a heater that is configured to heat a mixture of magnetic particles and a resin material to melt the resin material;
a nozzle that extends in a tubular form in an axial direction and has an internal flow passage, which is configured to conduct the mixture in a state where the resin material is molten, wherein the nozzle has a discharge port which is configured to discharge the mixture conducted through the internal flow passage and thereby form each of a plurality of filaments respectively shaped in a form of a thread;
a magnetic field applicator that is configured to apply a magnetic field, which is directed in the axial direction, to the internal flow passage, wherein the magnetic field has a magnitude that is sufficient to orient each of the magnetic particles in a direction along an axis of easy magnetization of the magnetic particle and to magnetize each of the magnetic particles; and
a stage that has a stage surface on which the plurality of filaments discharged from the discharge port are placed, wherein:

the nozzle and the stage are configured such that the discharge port is relatively movable with respect to the stage surface in any direction in three dimensions of space;

the discharge port is relatively movable with respect to the stage surface in any direction in the three dimensions of space such that the plurality of filaments, each of which is discharged from the discharge port and is placed on the stage surface, are stacked to form an arbitrary shape, and an extending direction of each of the plurality of filaments placed on the stage surface corresponds to a target magnetization direction of the filament; and in a transverse cross-section of the magnetic field applicator that is perpendicular to the axial direction, the magnetic field applicator includes an inner surface located at a side of the magnetic field applicator adjacent to the nozzle and configured to form one of an N-polarity or an S-polarity, and an outer surface located at a side of the magnetic field applicator opposite to the nozzle and configured to form another one of the N-polarity or the S-polarity, to reverse an orientation of a magnetic moment of the magnetic particles in the nozzle from one axial direction to another axial direction when the magnetic particles flow from an upstream side to a downstream side in the nozzle between one axial end and another axial end of the magnetic field applicator.

2. The magnet manufacturing device according to claim 1, wherein:
the magnetic field applicator includes:
a first permanent magnet that has a first magnetic pole surface which is flat and has a first magnetic polarity that is the one of the N-polarity or the S-polarity; and
a second permanent magnet that has a second magnetic pole surface which is flat and has the first magnetic polarity; and
the first magnetic pole surface and the second magnetic pole surface are opposed to each other while the nozzle is interposed between the first magnetic pole surface and the second magnetic pole surface such that the first magnetic pole surface and the second magnetic pole surface comprise the inner surface of the magnetic field applicator.

3. The magnet manufacturing device according to claim 1, wherein the magnetic field applicator is a permanent magnet that surrounds all around an outer peripheral surface of the nozzle in a circumferential direction, and wherein
a whole of the inner surface has a common magnetic polarity.

4. The magnet manufacturing device according to claim 1, wherein:
the magnetic field applicator includes:
a first permanent magnet that has a plurality of magnet segments which are arranged in an Halbach array; and
a second permanent magnet that has a plurality of magnet segments arranged in a Halbach array;
the first permanent magnet and the second permanent magnet are respectively located on two opposite sides of the nozzle while the nozzle is interposed between the first permanent magnet and the second permanent magnet; and
one magnet segment among the plurality of magnet segments of the first permanent magnet has a first magnetic pole surface, which has a first magnetic polarity that is the one of the N-polarity or the S-polarity, and one magnet segment among the plurality of magnet segments of the second permanent magnet has a second magnetic pole surface, which has the first magnetic polarity and is opposed to the first magnetic pole surface while the nozzle is interposed between the first magnetic pole surface and the second magnetic pole surface such that the first magnetic pole surface and the second magnetic pole surface comprise the inner surface of the magnetic field applicator.

5. The magnet manufacturing device according to claim 1, comprising at least one stage magnet that is configured to be placed on the stage surface, wherein:
the plurality of filaments are drawn on the stage surface by relatively moving the discharge port with respect to the stage surface, and the plurality of filaments drawn on the stage surface include a first filament and a second filament, wherein the first filament and the second filament are adjacent to each other and parallel to each other and are arranged such that a start point of the first filament and a start point of the second filament are adjacent to each other, and a terminal point of the first filament and a terminal point of the second filament are adjacent to each other; and
the at least one stage magnet is prepositioned on the stage surface at a location, which is adjacent to a location of at least one of the start point and the terminal point of each of the first filament and the second filament to be drawn on the stage surface, such that a magnetic polarity of a surface of the at least one stage magnet is opposite to a magnetic polarity of an end surface of each of the first filament and the second filament which is located in the at least one of the start point and the terminal point of each of the first filament and the second filament and is opposed to the surface of the at least one stage magnet.

6. The magnet manufacturing device according to claim 1, comprising at least one soft magnetic material that is configured to be placed on the stage surface, wherein:
the plurality of filaments are drawn on the stage surface by relatively moving the discharge port with respect to the stage surface, and the plurality of filaments drawn on the stage surface include a first filament and a second filament, wherein the first filament and the second filament are adjacent to each other and parallel to each other and are arranged such that a start point of the first filament and a start point of the second filament are adjacent to each other, and a terminal point of the first filament and a terminal point of the second filament are adjacent to each other; and
the at least one soft magnetic material is prepositioned on the stage surface at a location, which is adjacent to a location of at least one of the start point and the terminal point of each of the first filament and the second filament to be drawn on the stage surface, such that the at least one soft magnetic material is opposed to an end surface of each of the first filament and the second filament located in the at least one of the start point and the terminal point of each of the first filament and the second filament.

7. A magnet manufacturing device comprising:
a heater that is configured to heat a mixture of magnetic particles and a resin material to melt the resin material;
a nozzle that extends in a tubular form in an axial direction and has an internal flow passage, which is configured to conduct the mixture in a state where the resin material is molten, wherein the nozzle has a discharge port which is configured to discharge the mixture conducted through the internal flow passage and thereby form each of a plurality of filaments respectively shaped in a form of a thread;

a magnetic field applicator that is configured to apply a magnetic field, which is directed in the axial direction, to the internal flow passage, wherein the magnetic field has a magnitude that is sufficient to orient each of the magnetic particles in a direction along an axis of easy magnetization of the magnetic particle and to magnetize each of the magnetic particles;

a stage that has a stage surface on which the plurality of filaments discharged from the discharge port are placed; and at least one stage magnet that is configured to be placed on the stage surface, wherein:

the nozzle and the stage are configured such that the discharge port is relatively movable with respect to the stage surface in any direction in three dimensions of space;

the discharge port is relatively movable with respect to the stage surface in any direction in the three dimensions of space such that the plurality of filaments, each of which is discharged from the discharge port and is placed on the stage surface, are stacked to form an arbitrary shape, and an extending direction of each of the plurality of filaments placed on the stage surface corresponds to a target magnetization direction of the filament;

the plurality of filaments are drawn on the stage surface by relatively moving the discharge port with respect to the stage surface, and the plurality of filaments drawn on the stage surface include a first filament and a second filament, wherein the first filament and the second filament are adjacent to each other and parallel to each other and are arranged such that a start point of the first filament and a start point of the second filament are adjacent to each other, and a terminal point of the first filament and a terminal point of the second filament are adjacent to each other; and the at least one stage magnet is prepositioned on the stage surface at a location, which is adjacent to a location of at least one of the start point and the terminal point of each of the first filament and the second filament to be drawn on the stage surface, such that a magnetic polarity of a surface of the at least one stage magnet is opposite to a magnetic polarity of an end surface of each of the first filament and the second filament which is located in the at least one of the start point and the terminal point of each of the first filament and the second filament and is opposed to the surface of the at least one stage magnet.

8. A magnet manufacturing device comprising:

a heater that is configured to heat a mixture of magnetic particles and a resin material to melt the resin material;

a nozzle that extends in a tubular form in an axial direction and has an internal flow passage, which is configured to conduct the mixture in a state where the resin material is molten, wherein the nozzle has a discharge port which is configured to discharge the mixture conducted through the internal flow passage and thereby form each of a plurality of filaments respectively shaped in a form of a thread;

a magnetic field applicator that is configured to apply a magnetic field, which is directed in the axial direction, to the internal flow passage, wherein the magnetic field has a magnitude that is sufficient to orient each of the magnetic particles in a direction along an axis of easy magnetization of the magnetic particle and to magnetize each of the magnetic particles;

a stage that has a stage surface on which the plurality of filaments discharged from the discharge port are placed; and at least one soft magnetic material that is configured to be placed on the stage surface, wherein:

the nozzle and the stage are configured such that the discharge port is relatively movable with respect to the stage surface in any direction in three dimensions of space;

the discharge port is relatively movable with respect to the stage surface in any direction in the three dimensions of space such that the plurality of filaments, each of which is discharged from the discharge port and is placed on the stage surface, are stacked to form an arbitrary shape, and an extending direction of each of the plurality of filaments placed on the stage surface corresponds to a target magnetization direction of the filament;

the plurality of filaments are drawn on the stage surface by relatively moving the discharge port with respect to the stage surface, and the plurality of filaments drawn on the stage surface include a first filament and a second filament, wherein the first filament and the second filament are adjacent to each other and parallel to each other and are arranged such that a start point of the first filament and a start point of the second filament are adjacent to each other, and a terminal point of the first filament and a terminal point of the second filament are adjacent to each other; and the at least one soft magnetic material is prepositioned on the stage surface at a location, which is adjacent to a location of at least one of the start point and the terminal point of each of the first filament and the second filament to be drawn on the stage surface, such that the at least one soft magnetic material is opposed to an end surface of each of the first filament and the second filament located in the at least one of the start point and the terminal point of each of the first filament and the second filament.

* * * * *